(12) United States Patent
Ruskin et al.

(10) Patent No.: US 11,087,578 B2
(45) Date of Patent: Aug. 10, 2021

(54) VOTING BOOTH, SYSTEM, AND METHODS OF MAKING AND USING SAME

(71) Applicants: Daniel Bernard Ruskin, Westport, CT (US); Jonathan Davis, West Hartford, CT (US)

(72) Inventors: Daniel Bernard Ruskin, Westport, CT (US); Jonathan Davis, West Hartford, CT (US)

( * ) Notice: Subject to any disclaimer, the term of this patent is extended or adjusted under 35 U.S.C. 154(b) by 138 days.

(21) Appl. No.: 16/699,508

(22) Filed: Nov. 29, 2019

(65) Prior Publication Data

US 2020/0160641 A1 May 21, 2020

Related U.S. Application Data

(63) Continuation-in-part of application No. 16/211,678, filed on Dec. 6, 2018, now abandoned.

(60) Provisional application No. 62/791,775, filed on Jan. 12, 2019, provisional application No. 62/767,759, filed on Nov. 15, 2018.

(51) Int. Cl.
| | |
|---|---|
| *G06K 17/00* | (2006.01) |
| *G07C 13/00* | (2006.01) |
| *G06K 7/14* | (2006.01) |
| *H04L 9/32* | (2006.01) |
| *G06F 3/0488* | (2013.01) |
| *G06F 3/0482* | (2013.01) |

(52) U.S. Cl.
CPC .......... *G07C 13/00* (2013.01); *G06K 7/1413* (2013.01); *H04L 9/3247* (2013.01); *G06F 3/0482* (2013.01); *G06F 3/04883* (2013.01)

(58) Field of Classification Search
CPC .... G07C 13/00; G06K 7/1413; H04L 9/3247; H04L 9/3234; H04L 9/0877; H04L 9/008; H04L 2209/463; G06F 3/04883; G06F 3/0482
See application file for complete search history.

(56) References Cited

U.S. PATENT DOCUMENTS

| | | | |
|---|---|---|---|
| 6,081,793 A | 6/2000 | Challener et al. | |
| 6,817,515 B2 | 11/2004 | Winnett | |
| 6,950,948 B2 | 9/2005 | Neff | |
| 6,971,574 B1 | 12/2005 | Herskowitz | |
| 7,237,717 B1 * | 7/2007 | Rao | G06F 16/951 |
| | | | 235/386 |
| 7,260,552 B2 | 8/2007 | Riera Jorba et al. | |

(Continued)

FOREIGN PATENT DOCUMENTS

| | | | |
|---|---|---|---|
| CN | 107294727 A | 10/2017 | |
| EP | 2586154 A1 | 5/2013 | |

(Continued)

OTHER PUBLICATIONS

Author: Ben Adida, Title: Helios: Web-based Open-Audit Voting.

(Continued)

*Primary Examiner* — Thien T Mai

(57) ABSTRACT

A non-volatile computer readable medium is disclosed comprising computer program instructions that, when executed by at least one hardware processor, configure the at least one hardware processor to: display a ballot to a voter; collect candidate selections from a voter; and generate an encrypted ballot variant and a plaintext ballot variant. Corresponding systems and methods are also disclosed.

12 Claims, 14 Drawing Sheets

(56) References Cited

U.S. PATENT DOCUMENTS

| | | | |
|---|---|---|---|
| 7,360,094 | B2 | 4/2008 | Neff |
| 7,389,250 | B2 | 6/2008 | Neff |
| 7,458,512 | B2 | 12/2008 | Colson et al. |
| 7,640,181 | B2 | 12/2009 | McClure et al. |
| 8,145,520 | B2 | 3/2012 | Cardone et al. |
| 8,162,215 | B2 | 4/2012 | Chaum |
| 8,554,607 | B2 | 10/2013 | Barnhart |
| 8,660,889 | B2 | 2/2014 | Liesenfelt |
| 8,713,319 | B2 | 4/2014 | Puiggali Allepuz et al. |
| 9,401,059 | B2 | 7/2016 | Backert et al. |
| 9,652,920 | B2 | 5/2017 | Chen |
| 9,836,908 | B2 | 12/2017 | Spanos et al. |
| 2002/0077887 | A1* | 6/2002 | London Shrader .... G07C 13/00 705/12 |
| 2005/0160272 | A1* | 7/2005 | Teppler ................ H04L 9/3218 713/178 |
| 2005/0203966 | A1* | 9/2005 | Labrou ................. G06Q 10/10 |
| 2005/0284935 | A1* | 12/2005 | Sinha .................... G07C 13/00 235/386 |
| 2006/0081706 | A1 | 4/2006 | Onischuk |
| 2007/0267492 | A1 | 11/2007 | Pont |
| 2008/0000969 | A1 | 1/2008 | Salomonsen et al. |
| 2009/0072030 | A1* | 3/2009 | Cardone ............... G07C 13/00 235/386 |
| 2009/0254750 | A1* | 10/2009 | Bono .................... H04L 9/0822 713/170 |
| 2010/0114674 | A1 | 5/2010 | Fernandez et al. |
| 2015/0012339 | A1 | 1/2015 | Onischuk |
| 2017/0109955 | A1 | 4/2017 | Ernest et al. |
| 2017/0352219 | A1 | 12/2017 | Spanos et al. |
| 2017/0358161 | A1 | 12/2017 | Hao et al. |

FOREIGN PATENT DOCUMENTS

| | | |
|---|---|---|
| EP | 2429115 B1 | 2/2019 |
| KR | 101837169 | 5/2013 |
| WO | WO2001022200 A2 | 3/2001 |
| WO | 2007148258 A2 | 12/2007 |
| WO | 2001020562 A2 | 5/2013 |
| WO | 2002056230 A2 | 5/2013 |
| WO | 2018136991 A1 | 8/2018 |
| WO | 2019165906 A1 | 9/2019 |

OTHER PUBLICATIONS

Authors: Peter Y.A. Ryan, David Bismark, James Heather, Steve Schneider, Zhe Xia; Title: The Pret a Voter Verifiable Election System; Journal IEEE Transactions on Information Forensics and Security.

Authors: David Chaum, Richard Carback, Jeremy Clark, Aleksander Essex, Stefan Popoveniuc, Ronald L. Rivest; Title: Scantegrity II: End-to-End Verifiability for Optical Scan Election System using Invisible Ink Confirmation Codes.

Authors: Filip Zagorski, Richard T. Carback, David Chaum, Jeremy Clark, Aleksander Essex, Poorvi L. Vora; Title: Remotegrity: Design and Use of an End-to-End Verfiable Remote Voting System.

Authors: Somnath Panja and Bimal Kumar Roy; Title: Secure end-to-end verifiable e-voting system using zero knowledge based blockchain.

Authors: Willem Wyndham, Spencer Chen, and Saurav Das; Title: Proposal for Secure Electronic Voting; Date: Jun. 29, 2016.

Authors: Benlog; Title: Blockchain and Voting; Date: Dec. 28, 2017.

Authors: Paul Hammant; Title: 'Old-School' Merkle Trees Rock; Date: Sep. 17, 2017.

Authors: Market Klonowski, Miroslaw Kutylowski, Anna Lauks, and Filip Zagórski; Title: A Practical Voting Scheme with Receipts; Item: International Conference on Information Security; Date: Sep. 20, 2005; pp. 490-497; Issue No. 8; Publish Country: Singapore.

Authors: David Chaum, Alex Florescu, Mridul Nandi, Stefan Popoveniuc, Jan Rubio, Poorvi L. Vora, and Filip Zagórski; Title: Paperless Independently-Verifiable Voting.

Authors: Ben Adida and C. Andrew Neff; Title: Ballot Casting Assurance.

Authors: C. Andrew Neff; Title: Practical High Certainty Intent Verification for Encrypted Votes; Date: Oct. 14, 2004.

Authors: Market Klonowski, Miroslaw Kutylowski, Anna Lauks, and Filip Zagórski; Title: A Practical Voting Scheme with Receipts; Item: International Conference on Information Security; Date: Sep. 20, 2005; pp. 490-497; Issue No. 8; Publish Country: Singapore.

Authors: Claudia Ziegler Acemyan, Philip Kortum, Michael D. Byrne, Dan S. Wallach; Title: Summative Usability Assessments of STAR-Vote: A Cryptographically Secure e2e Voting System That Has Been Empirically Proven to Be Easy to Use; Date: Dec. 4, 2018.

Authors: Susan Bell, Josh Benaloh, Michael D. Byrne, et al; Title: STAR-Vote: A Secure, Transparent, Auditable, and Reliable Voting System; Journal: USENIX Journal of Election Technology and Systems (JETS); Journal vol. 1, No. 1.

Authors: David Chaum, Richard Carback, Jeremy Clark, Aleksander Essex, Stefan Popoveniuc, Ronald L. Rivest; Title: Scantegrity II: End-to-End Verifiability for Optical Scan Election Systems using Invisible Ink Confirmation Codes.

Authors: Filip Zagorski, Richard T. Carback, David Chaum, Jeremy Clark, Aleksander Essex, Poorvi L. Vora; Title: Remotegrity: Design and Use of an End-to-End Verifiable Remote Voting System.

Authors: Tom Burt; Title: Protecting democratic elections through secure, verifiable voting; Publisher: The Official Microsoft Blog.

* cited by examiner

VOTING BOOTH, SYSTEM, AND METHODS OF MAKING AND USING SAME

CROSS-REFERENCE TO RELATED APPLICATIONS

This application claims priority from U.S. Provisional Patent Application No. 62/791,775, filed Jan. 12, 2019, which is incorporated by reference herein in its entirety.

This application is a continuation-in-part of U.S. patent application Ser. No. 16/211,678, filed Dec. 6, 2018, which claims the benefit of U.S. Provisional Patent Application No. 62/767,759, filed 15 Nov. 2018, each of which is incorporated by reference herein in its entirety.

BACKGROUND

This disclosure relates generally to election systems, and more particularly to voter-verifiable electronic election systems that minimize the use of excessive computational, memory, or networking resources.

Non-voter-verifiable election systems are generally known. Non-voter-verifiable election systems have features including collecting ballots from voters and aggregating said ballots into final election results (i.e. tallies). It is problematic when participants in the non-voter-verifiable election systems maliciously tamper with the ballots prior to inclusion in the final election results. In this scenario, voters have no recourse because non-voter-verifiable election systems do not allow voters to detect such ballot tampering.

Voter-verifiable blockchain-based election systems have been proposed. Voter-verifiable blockchain-based election systems have features including collecting ballots from voters, aggregating said ballots into final election results, and allowing voters to detect ballot tampering. However, existing voter-verifiable blockchain-based election systems make use of inefficient blockchain systems. Existing blockchain systems are undesirable because they require a large amount of computing, memory, and networking resources. Specifically, existing blockchain systems comprise blocks which are transmitted to various network peers. In the use of existing blockchain systems, substantial computing resources are needed to generate blocks, substantial memory resources are needed to store blocks, and substantial networking resources to needed to transmit blocks over a network.

Voter-verifiable elections systems have been proposed. Voter-verifiable election systems have features including collecting ballots from voters, aggregating said ballots into final election results, and allowing voters to detect ballot tampering. However, existing voter-verifiable election systems are not user friendly and are complex for voters to use. In addition, existing voter-verifiable election systems do not allow voters to efficiently vote from a remote polling location.

It would be useful to develop a user friendly election device, system, and method that allows for remote voting, allows voters to verify their ballots and detect ballot tampering, and minimizes the use of computing, memory, and networking resources.

SUMMARY

One embodiment described herein is a non-volatile computer readable medium comprising computer program instructions that, when executed by at least one hardware processor, configure the at least one hardware processor to: display a ballot to a voter; collect candidate selections from a voter; and generate an encrypted ballot variant and a plaintext ballot variant. A method of manufacturing said medium is also disclosed.

Another embodiment described herein is a system comprising a first hardware processor configured to: display a ballot to a voter; collect candidate selections from a voter; and generate an encrypted ballot variant and a plaintext ballot variant.

Yet another embodiment described herein is a method of conducting an electronic election that is implemented by at least one hardware processor, the method comprising: displaying a ballot to a voter; collecting candidate selections from a voter; and generating an encrypted ballot variant and a plaintext ballot variant.

DETAILED DESCRIPTION

Figure 1:
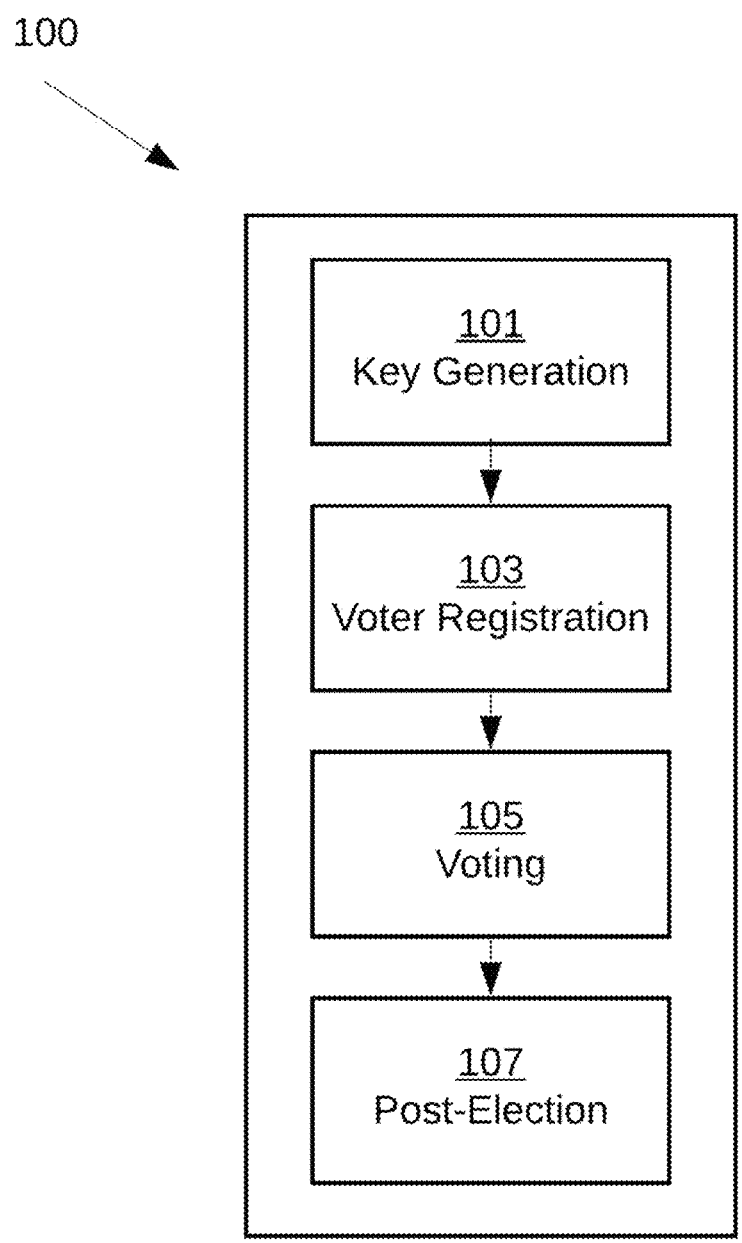
FIG. 1 depicts a first embodiment of the election method.

The disclosed embodiments provide a voting booth 600, a public auditor computer 1001, a privileged auditor computer 1003, an election official computer 1006, a receipt scanner 703, and a bulletin board 900. The voting booth 600 collects ballots 1100 from registered voters, posts the ballots 1100 to the bulletin board 900, and prints out ballot receipts. Each voter then scans their ballot receipts on the receipt scanner 703, which performs receipt validity audits 1601. Public auditor computers 1001 monitor the bulletin board 900 in real-time and perform public audits 1605. Election officials 1008 perform voter registration 103, ballot adjudication 1401, and paper recounts 1411 with the aid of election official computers 1006. Privileged auditors 1005 monitor voter registration 103, voting 105, ballot adjudication 1401, to perform privileged audits 1603 with the aid of privileged auditor computers 1003. The disclosed embodiments also provide a method 100 and system 1000 for orchestrating a secure electronic election. The privileged auditor computer 1003, election official computer 1006, receipt scanner 703, bulletin board 900, election method 100, and election system 1000 use less computing, memory, and networking resources than existing voting apparatus, systems, and methods. However, the presently disclosed apparatus, systems, and methods still allow voters to detect and correct ballot tampering. In addition, the presently disclosed apparatus, systems, and methods are user friendly.

As used herein, the term "hash" refers to a digest of an arbitrary message generated by a one-way hash function.

Figure 6:
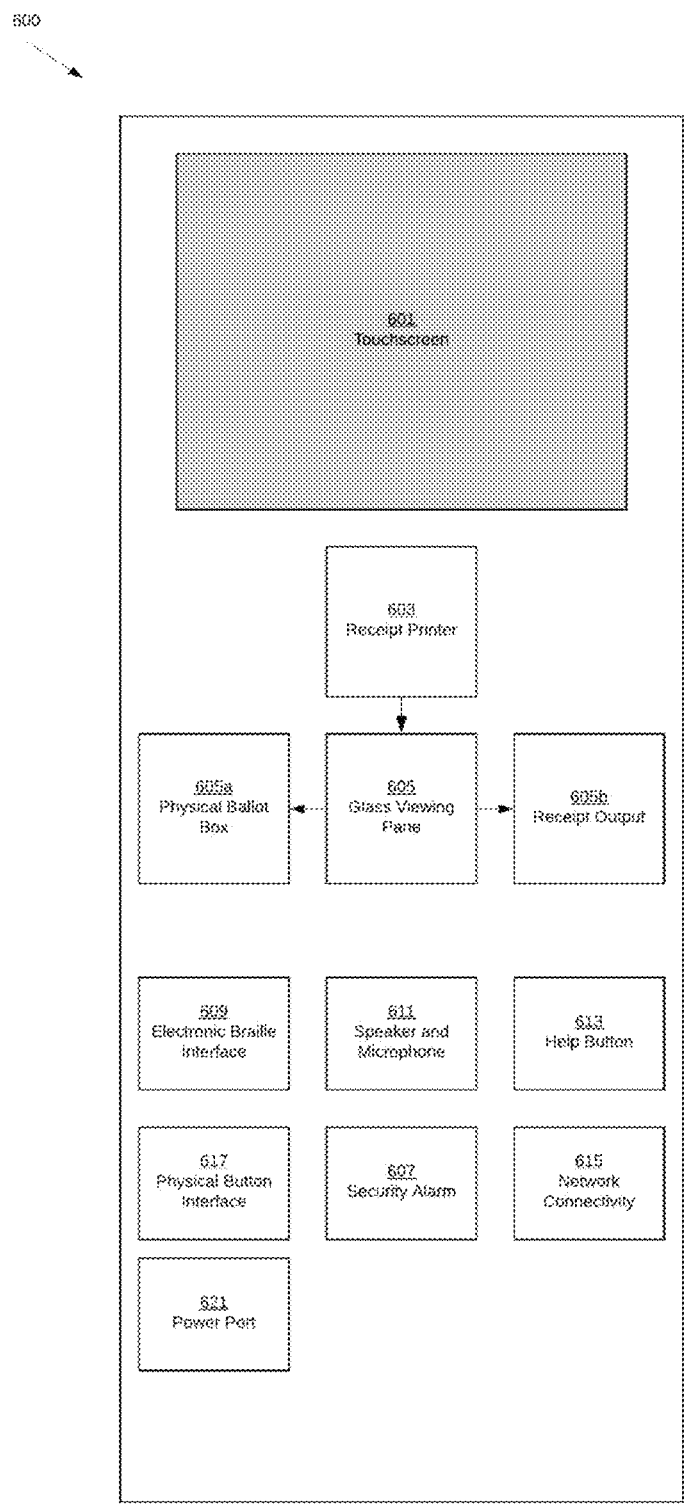
FIG. 6 depicts a first embodiment of the voting booth.

Referring to the drawings, FIG. 1 depicts a first embodiment of the election method 100. The election method 100 begins with the key generation step 101. Referring to FIG. 6, during the key generation step 101, election officials 1008 generate an election official keypair. The election official keypair comprises an election official public key 1401a and an election official private key 1401b. The private key 1401b is kept secure by election officials 1008 and is not released to third parties. The private key 1401b is uploaded to election official computers 1006. The election official public key 1401a is made public and is provided to public auditor computers 1001, privileged auditor computers 1003, receipt scanner computers 700, and voting booth computers 600. The keypair can be used to sign messages, verify message signatures, encrypt messages, and decrypt messages.

A wide variety of algorithms can be used to generate keypairs, including the election official keypair and voter keypair. One such algorithm is the Public-Key Cryptography Standards #1 (PKCS) algorithms published by RSA laboratories. These algorithms allows for the creation of a private key and a mathematically associated public key. A holder of a private key can apply a first mathematical operation to said private key and an arbitrary message to generate a digital signature of the arbitrary message. The holder of the private key can then transmit the message and digital signature to a recipient. The recipient can then apply a second mathematical operation to the public key, digital signature, and message to validate that the digital signature represents the true output of the first mathematical operation applied to the private key and message. The recipient does not need to possess the private key to perform the second mathematical operation. If the second mathematical operation indicates that the digital signature is valid, the recipient is substantially guaranteed that the message was digitally signed by a holder of the private key. It is mathematically infeasible for an entity to generate a signature that passes the second mathematical operation applied to a public key, unless said entity possesses the private key associated with said public key.

Similarly, these PKCS algorithms allow for private keys and public keys to be used for encryption purposes. A holder of a public key can apply a first mathematical operation to said public key and a message to generate an encrypted version of the message. The holder of the public key can then transmit the encrypted version of the message to a recipient. The recipient can then apply a second mathematical operation to the private key and encrypted version of the message, which yields the original message in plaintext. It is mathematically infeasible for an entity to decrypt a message encrypted using a public key, unless said entity possesses the private key associated with said public key.

In the first embodiment of the election method 100, some encryption is performed homomorphically. Homomorphic encryption transforms a set of plaintext messages into encrypted messages. Certain operations performed on the encrypted messages yield a result that, when decrypted, is equivalent to the result of same operations performed on the plaintext messages. For example, the addition operation performed on a set of encrypted messages may yield an encrypted result that, when decrypted, is equivalent to the result of addition performed on the plaintext versions of the encrypted messages. A variety of homomorphic encryption algorithms can be used for homomorphic encryption, including the Benaloh and Paillier algorithms. In the first embodiment of the method 100, the Paillier algorithm is used. In alternative embodiments of the method 100, a different algorithm may be chosen to support different operations on encrypted data (i.e. unpadded RSA may be chosen if multiplications are performed).

In the first embodiment of the election method 100, step 101 comprises the generation of the election official keypair. In alternative embodiments of the election method 100, step 101 may instead comprise the generation of other types of keys, such as homomorphic encryption keys, asymmetric keys, symmetric keys, or any other keys with desirable encryption properties. In some embodiments of the election method 100, the election official keypair is replaced by several sets of keys, wherein some keys are used for encryption and some keys are used for digital signatures. In some embodiments of the election method 100, the election official keypair is replaced by an alternative authentication mechanism such as a password.

Figure 8:
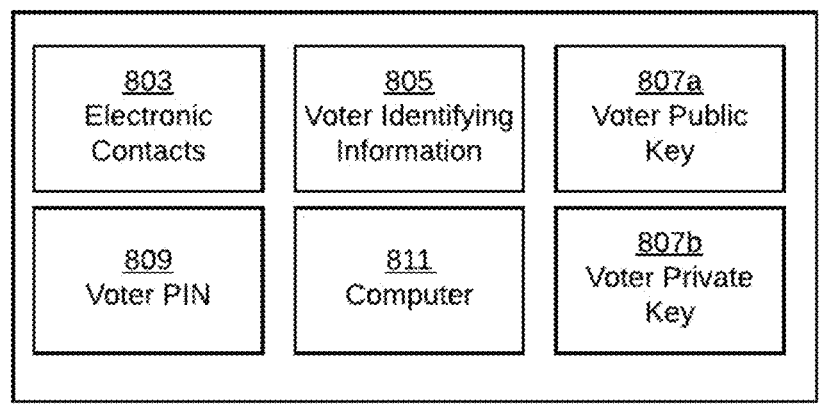
FIG. 8 depicts a first embodiment of the smartcard.

Referring to FIGS. 6 and 8, election method 100 continues with the voter registration step 103. The voter registration step 103 is performed by election officials 1008 in conjunction with each voter that wishes to vote. To perform step 103, election officials 1008 first validate each voter's identity by collecting and verifying registration materials. In the first embodiment of the method 100, registration materials comprise a passport or other form of citizenship. In alternative embodiments of the method 100, registration materials may comprise any documents that serve to validate the voter's identity or eligibility to vote. After a voter's identity has been validated, election officials 1008 continue step 103 by directing the election official computers 1006 to issue credentials to the voter. The voter will later present their credentials to the voting booth 600 for authentication purposes. Referring to FIG. 8, in the first embodiment of the method 100, the credentials comprise a smartcard 800. In alternative embodiments of the method 100, the credentials may instead comprise any electronic or non-electronic materials that identify a voter to the voting booth 600.

When a smartcard 800 is issued to the voter, the smartcard generates the voter keypair. The voter keypair comprises a voter public key 807a and a private key 807b. The smartcard 800 transmits the voter public key 807a through the electronic contacts 803 upon request (such as to election officials 1008 or the voting booth 600). The smartcard 800 does not reveal the private key 807b of the voter keypair. However, the smartcard 803 allows for various cryptographic operations to be performed using the private key 807b of the voter keypair, such as encryption and digital signature generation.

In alternative embodiments of the smartcard 800, alternative keys may be generated, such as homomorphic encryption keys, asymmetric keys, symmetric keys, or any other keys with desirable encryption properties. In some embodiments of the smartcard 800, the voter keypair is replaced by several sets of keys, wherein some keys are used for encryption and some keys are used for digital signatures. In some embodiments of the smartcard 800, the voter keypair is replaced by an alternative authentication mechanism such as a password.

Figure 9:
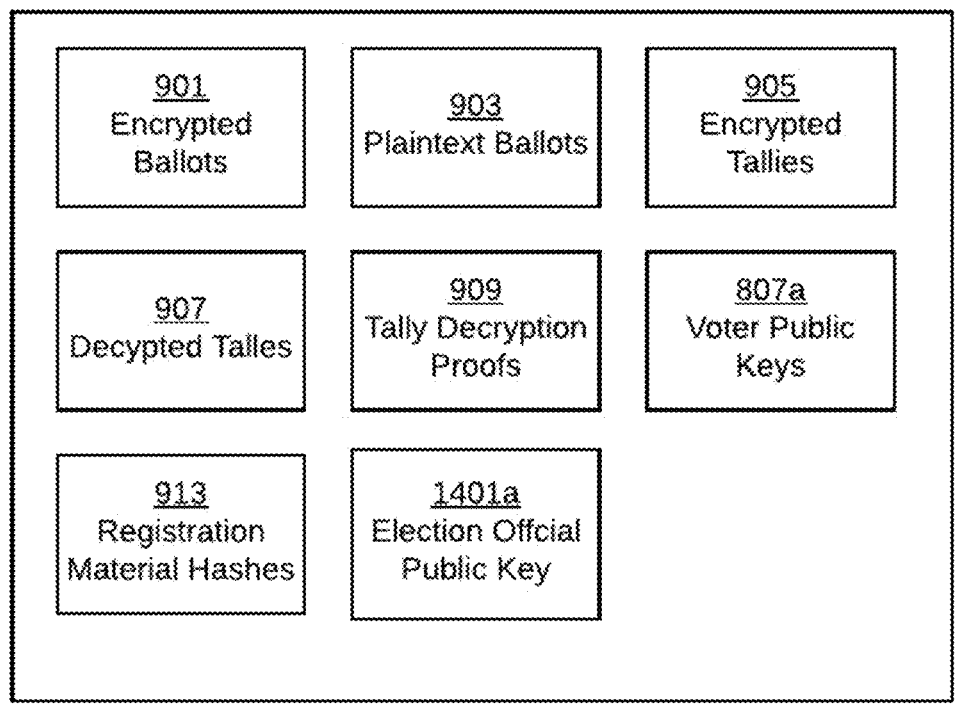
FIG. 9 depicts a first embodiment of the bulletin board.

Referring to FIG. 9, after each smartcard 800 is issued, step 103 continues when the voter public key 807a is retrieved by election official computer 1006 and posted to the bulletin board 900. The registration materials are also stored by the election official computer 1006. In the first embodiment of the method 100, a registration material hash 913 is also generated by the election official computer 1006 and is published to the bulletin board 900. The registration material hash 913 comprises a mathematical hash of any registration materials that were used to verify the voter's identity or eligibility to vote. In alternative embodiments of the smartcard 800, the registration material hash 913 may not be published due to privacy concerns.

A wide variety of algorithms can be used to generate hashes. One such algorithm is the Secure Hash Algorithm 2 (SHA-2). The SHA-2 hash algorithm takes an arbitrary message as input, runs a sequence of mathematical operations on said input, and returns a constant-length mathematical summary of said input known as a hash. The SHA-2 hash function always returns the same output hash for the same input value. It is mathematically infeasible to find two different input values that map to the same SHA-2 output hash; such a series of input values is called a collision. Collisions are rare for the SHA-2 hash function and other secure hash functions.

In the first embodiment of the election method 100, the voter registration step 103 is performed until the voting step 107 begins. In alternative embodiments of the election method 100, the voter registration step 103 may be performed continuously, even while voters are already voting via voting step 107.

Figure 11:
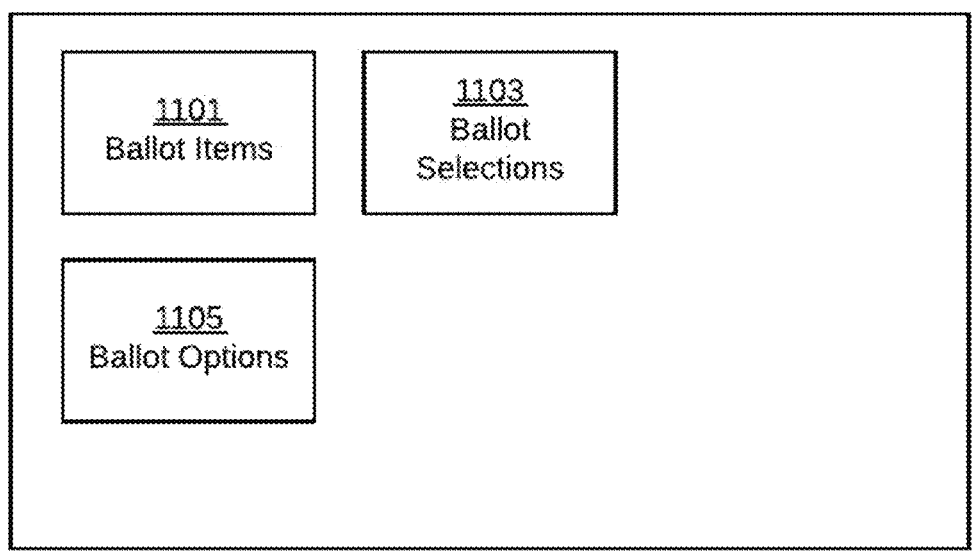
FIG. 11 depicts a first embodiment of the ballot.

Referring to FIG. 11, election method 100 continues with the voting step 105. Voters begin voting step 105 by visiting the voting booth 600 closest to them. Voting booths 600 are distributed to secure locations such as U.S. and foreign embassies, U.S. and foreign military bases, and U.S. and foreign polling places. Voting booths 600 are accompanied by pollworkers who assist voters with the voting process, and collect paper ballots 1100 when the voting booth 600 cannot be used.

After reaching a voting booth 600, voters continue step 105 by providing their credentials to the voting booth 600. Each voter inserts their smartcard 800 into a smartcard reader at this time, and inputs their PIN 809 using the touchscreen 601, electronic braille interface 609, microphone 611, physical button interface, 617, or any other input interfaces present on the voting booth 600. The PIN 809 is then transmitted to the smartcard 800 through the smartcard's 800 electronic contacts 803. The smartcard 800 then verifies that the PIN 809 submitted by the voter matches the PIN 809 stored in the smartcard's 800 memory. If the PIN 809 matches the smartcard's 800 memory, the smartcard 800 is unlocked and the voter is allowed to proceed with step 105. The smartcard 800 locks again once the smartcard 800 is removed from the voting booth 600. If the PIN 809 does not match the smartcard's 800 memory, the smartcard 800 is not unlocked and the voter must re-submit their PIN 809. In some embodiments of the method 100, the voter may only be allowed to submit a PIN 809 a certain number of times before the smartcard 800 locks permanently, or locks for a prespecified or algorithmic timeout period. In some embodiments of the method 100, the voter may not provide a smartcard 800 and PIN 809 to the voting booth, and may instead follow a different authentication flow or submit different credentials (for example, the voter may instead provide a photo ID or password for authentication purposes).

Once the voter successfully submits their credentials to the voting booth 600, step 105 continues with the voting booth 600 presenting a ballot 1100 to the voter. The ballot 1100 comprises a list of ballot items 1101. Each ballot item 1101 comprises a choice that the voter is asked to make; for example, the voter may be asked to answer a "Yes"/"No" question, choose a candidate for a presidential election, or answer any other question that can be presented on a ballot 1100. Each ballot item 1101 is associated with a list of ballot options 1105 that the voter may choose from (such as a list of candidates running for a governmental office), and may also comprise a write-in option. In the first embodiment of the election method 100, the voter is presented with a ballot 1101 on the touchscreen 601. The voter completes their ballot 1100 by touching the ballot options 1105 on the touchscreen 601 that reflect their choice; those ballot options 1105 are then stored as ballot selections 1103 in the ballot 1101. For example, if the ballot 1100 consists of a single ballot item 1101 for a presidential election, the voter may submit their ballot selection 1103 for the presidential election by pressing a button that is displayed on the touchscreen 601 next to the ballot option 1105 associated with their desired presidential candidate. The desired candidate choice is then stored as a ballot selection 1103 in the ballot 1100. In alternative embodiments of the election method 100, the voter completes their ballot 1100 using the electronic braille interface 609, microphone 611, physical button interface, 617, or any other input interfaces present on the voting booth 600. Some input interfaces on the voting booth 600 are designed to improve accessibility to disable voters.

Figure 12:
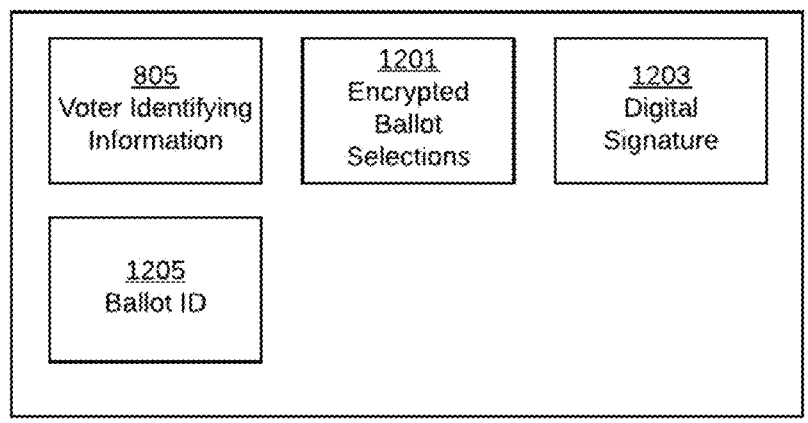
FIG. 12 depicts a first embodiment of the encrypted ballot variant.
Figure 13:
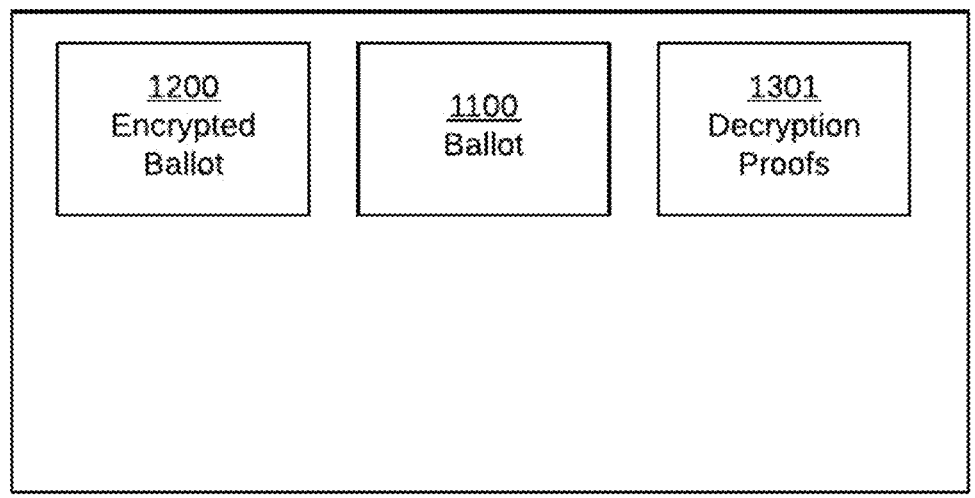
FIG. 13 depicts a first embodiment of the plaintext ballot variant.

Referring to FIGS. 12 and 13, after a voter submits their ballot 1100, step 105 continues with the voting booth 600 processing the ballot 1100. Ballot processing comprises the generation of two ballot variants: an encrypted ballot variant 1200 and a plaintext ballot variant 1300. In the first embodiment of the method 100, the encrypted ballot variant's 1200 digital signature 1203 is generated by transmitting the encrypted ballot variant 1200 to the unlocked smartcard 800, which then digitally signs the encrypted ballot variant 1200 and transmits the digital signature 1203 back to the voting booth 600. Transmissions to and from the smartcard 800 occur through the smartcard's electronic contacts 803. In alternative embodiments of the method 100, the digital signature 1203 may be populated via a keypair stored on the voting booth 600. In alternative embodiments of the method 100, a digital signature 1203 may not be generated at all, and alternative means may be used to authenticate the ballot (such as a password).

After the ballot variants are generated, step 105 continues with the voting booth 600 displaying the plaintext ballot variant 1300 to the voter. The plaintext ballot variant 1300 may be shown to the voter on the touchscreen 601, on a physical receipt printed by the receipt printer 603 and held under the glass viewing pane 605, or in any other manner that makes the plaintext ballot variant 1300 content clear to the voter. After the voter has reviewed the plaintext ballot variant 1300, the voter decides whether to confirm or spoil their ballot 1100. In the first embodiment of the election method 100, the voter is substantially prevented from recording, copying, or otherwise retaining the copy of the plaintext ballot variant 1300 unless the voter spoils their ballot. For example, the plaintext ballot variant 1300 may be protected under the glass viewing pane 605. Physical security measures may also be in place to restrict cameras or other recording devices from entering the voting booth 600.

If the voter chooses to confirm their ballot 1100, the plaintext ballot variant 1300 is printed by the receipt printer 603 and deposited into the physical ballot box 605a. The encrypted ballot variant 1200 is also printed by the receipt printer 603 and provided to the voter through the receipt output 605b. The encrypted ballot variant 1200 is also published to the bulletin board 900. In the first embodiment of the election method 100, the voter confirms their ballot 1100 by pressing a button labeled "Confirm" on the touchscreen. In alternative embodiments of the election method 100, the voter confirms their ballot 1100 using the electronic braille interface 609, microphone 611, physical button interface, 617, or any other input interfaces present on the voting booth 600.

If the voter chooses to spoil their ballot 100, the plaintext ballot variant 1300 is printed by the receipt printer 603 and provided to the voter through the receipt output 605b. The plaintext ballot variant 1200 is also published to the bulletin board 900. The voter may then proceed to restart step 105 and fill in a new ballot 1100. The voter may choose to spoil their ballot for any reason; for example, the ballot selections 1103 displayed on the plaintext ballot variant 1300 may not match the voter's intentions. The voter may also wish to challenge the voter's encryptions via the receipt validity audits 1601. In the first embodiment of the election method 100, the voter spoils their ballot 1100 by pressing a button labeled "Spoil" on the touchscreen.

In the first embodiment of the election method 100, the voter may only confirm a single ballot 1100; once a voter has confirmed a ballot 1100, the voting booth 600 no longer allows the voter to view or complete any additional ballots 1100. In alternative embodiments of the election method 100, the voter may be permitted to cast multiple ballots 100. In alternative embodiments of the election method 100, the voter may be permitted to cast multiple ballots 100, and logic may be employed to ensure that only one confirmed ballot 100 is included in the encrypted tallies 905 and decrypted tallies 907.

Figure 7:
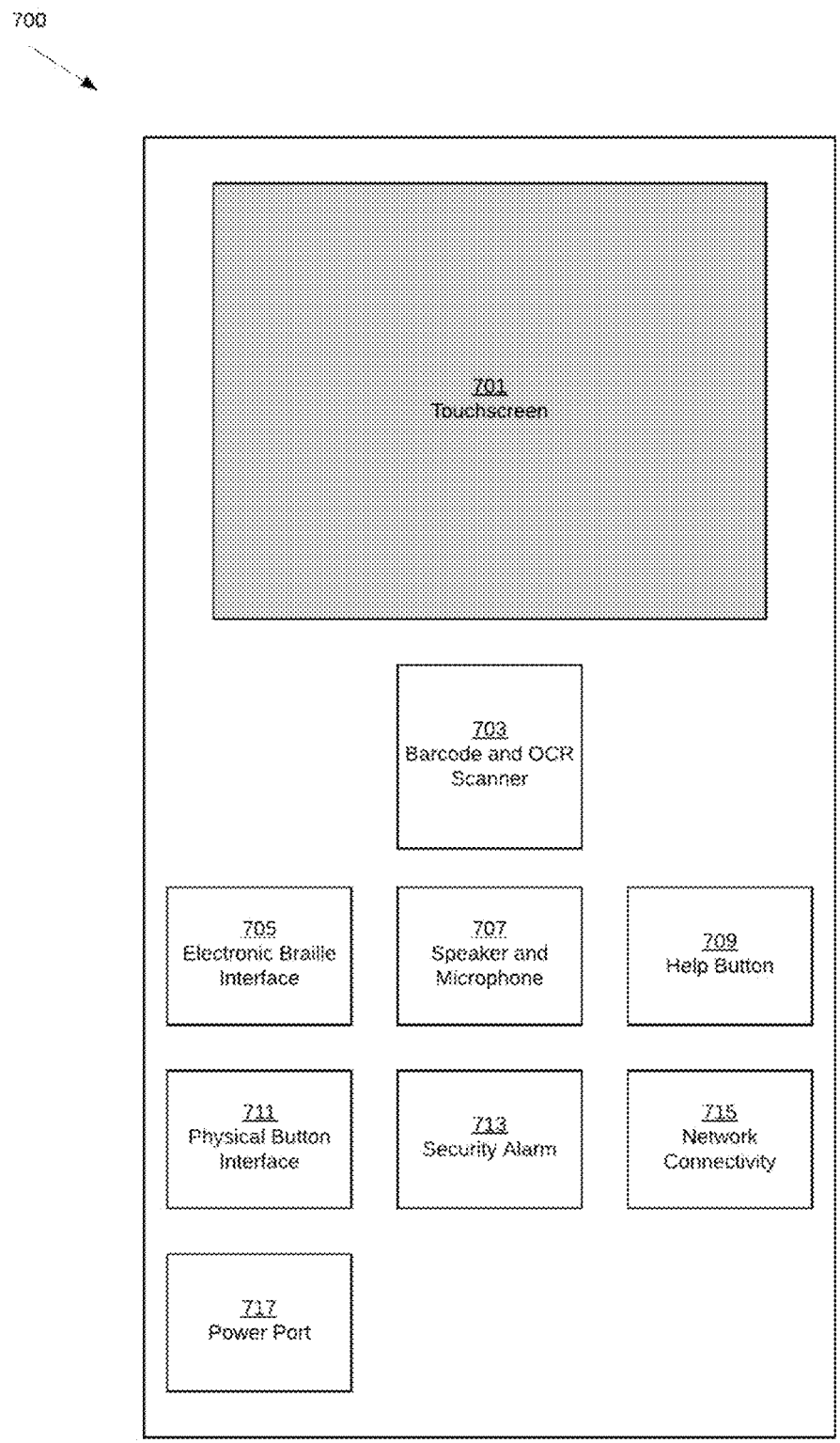
FIG. 7 depicts a first embodiment of the receipt scanner.

Referring to FIG. 7, the first embodiment of the election method 100, after receiving a receipt from the receipt printer 603, the voter proceeds to scan the receipt on the receipt scanner 700. The receipt scanner 700 parses the receipt using optical character recognition (OCR) and a barcode scanner. In alternative embodiments of the receipt scanner 700, the receipt scanner 700 may parse the receipt using any other method that allows the receipt scanner 700 to efficiently and accurately read the content on the receipt. The receipt scanner 700 then performs receipt validity audits 1601. In alternative embodiments of the election method 100, the receipt validity audits 1601 may be performed without the use of a computer, on the voter's personal computer, on a mobile phone, or on a third-party's computer. In alternative embodiments of the election method 100, the receipt validity audits 1601 may be performed with the assistance of a website or downloadable computer application, or may not be performed at all.

Step 105 may be performed by any number of voters and voting booths 600 while polls are open. In the first embodiment of the election method 100, polls open and close at predetermined times (specified in coordinated universal time). In alternative embodiments of the election method 100, polls may open and close according to alternative criteria. For example, polls may open and close according to resolutions by a legislative body, according to digitally signed authorizations by election officials 1106, or via any other criteria.

Figure 2:
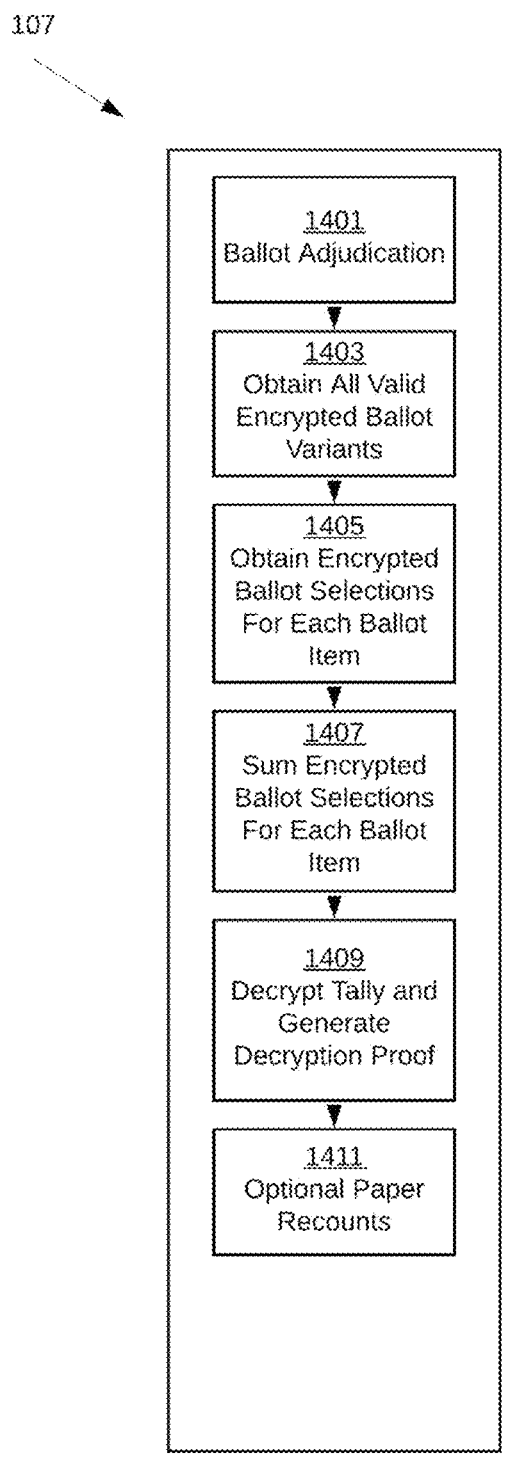
FIG. 2 depicts a first embodiment of the post-election step.

Referring to FIG. 2, once polls close, the election method continues with post-election step 107. Election officials 1008 are responsible for completing post-election step 107 with the assistance of the election official computer 1006. Post-election step 107 comprises ballot adjudication 1401. In some embodiments, the election method 100 may comprise any number of alternative voting mechanisms; for example, voters may have the option of voting via paper, fax, email, or the internet. The ballot adjudication process 1401 first comprises the collection of ballots 1100 that were cast with alternative voting mechanisms (hereafter referred to as alternative casted ballots 1100). Alternative casted ballots 1100 may have a different format than ballots 1100 cast via the voting booth 600; for example, alternative casted ballots 1100 cast via paper may represent ballot selections 1103 via filled in bubbles. In this scenario, if a bubble next to a presidential candidate named "John Smith" is filled in with a pen on a paper ballot 1100, the voter is considered to have provided a ballot selection 1103 for the ballot option 1105 associated with "John Smith."

Once alternative casted ballots 1100 are collected, the alternative casted ballots 1100 are validated for correctness; for example, if a voter submitted a form of identification along with a paper ballot, the form of identification is validated (i.e. a passport may be validated). Alternative casted ballots 1100 are then uploaded to the election official computer 1006. The election official computer 1006 converts the alternative casted ballots 1100 to their encrypted ballot variants 1200, and the encrypted ballot variants 1200 are posted to the bulletin board 900 along with the result of the correctness validation. For example, if paper ballots 1100 with filled-in bubbles are received, the election official computer 1006 (or an attached accessory such as a scanner) first parses the filled-in bubbles to determine the ballot selections 1103 that the user provided via the filled-in bubbles. The election official computer 1006 then generates an encrypted ballot variant 1200 with encrypted ballot selections 1301 that reflect those ballot selections 1103—in the same manner that an encrypted ballot variant 1200 would be generated for ballot selections 1103 submitted via a voting booth 600.

If multiple encrypted ballot variants 1200 are posted for a given voter, rules are applied by the election official computer 1006 to reconcile the encrypted ballot variants 1200 and determine which encrypted ballot variants 1200 take priority; the remaining encrypted ballot variants 1200 are marked as invalid on the bulletin board 900. In the first embodiment of the election method 100, encrypted ballot variants 1200 published for alternative casted ballots 1100 always take priority over encrypted ballot variants 1200 published for ballots 1100 collected via the voting booths 600. In the first embodiment of the election method 100, if a voter casts several alternative casted ballots 1100, the encrypted ballot variants 1200 for the final alternative casted ballot 1100 received takes priority. In alternative embodiments of the election method 100, alternative methods may be used to determine which encrypted ballot variants 1200 take priority; for example, voters may be contacted for this purpose. Ballot adjudication 1401 completes after the alternative casted ballots 1100 have been validated, posted to the bulletin board 900, and reconciled.

When a ballot 1101 is converted to an encrypted ballot variant 1200, the encrypted ballot selections 1201 are formatted in a manner compatible with the tallying procedure. Specifically, every encrypted ballot variant 1200 contains an encrypted ballot selection 1201 for every option 1105 for every ballot item 1101. Each encrypted ballot selection 1201 in an encrypted ballot variant 1200 contains an encrypted representation of the number one if the converted ballot 1101 contains a ballot selection 1103 for the associated option 1105 (thus indicating that the voter selected that option 1105), and an encrypted representation of the number zero if the converted ballot 1101 does not contain a ballot selection 1103 for the associated option 1105 (indicating that the voter did not select that option 1105).

In the first embodiment of the election method 100, encrypted ballot selections 1201 are generated with homomorphic encryption using the election official private key 1401b. This usage of homomorphic encryption allows the final tally for each option 1105 to be generated via a simple sum operation applied to the pertinent encrypted ballot selections 1201, wherein the pertinent encrypted ballot selections 1201 for a given option 1105 can be obtained directly from the encrypted ballot variants 1201 on the bulletin board. In alternative embodiments of the election method 100, alternative methods may be used to generate encrypted ballot selections 1201, such as symmetric encryption.

When a ballot 1101 is converted to an encrypted ballot variant 1200, write-in candidates are also converted to encrypted ballot selections 1201. A variety of methods may be used to convert write-in candidates to encrypted ballot selections 1201. In the first embodiment of the method 100, each encrypted ballot variant 1200 contains encrypted ballot selections 1201 for all non-write-in ballot options 1105, and also contains encrypted ballot selections 1201 for several write-in ballot options 1105 (wherein the write-in ballot options 1105 are generated dynamically based on the input of voters, and based on predefined write-ic values). The encrypted ballot selections 1201 that map to the voter's chosen ballot options 1105 (write-in or otherwise, as reflected in the voter's ballot selections 1103) contain encrypted representations of the number one, while the remaining encrypted ballot selections 1201 contain encrypted representations of the number zero. By including several encrypted ballot selections 1201 for write-in candidates in every ballot, ballot secrecy can be protected even when voters choose to vote for a write-in candidate. Third parties are not able to ascertain from a encrypted ballot variant 1200 which regular or write-in candidate a voter voted for. Third parties are not even able to ascertain from an encrypted ballot variant 1200 whether a voter cast write-in votes at all, because all encrypted ballot variants 1200 contain encrypted ballot selections 1201 for write-in ballot options 1105 (even if all of said encrypted ballot selections 1201 contain encrypted representations of the number zero).

In alternative embodiments of the election method 100, alternative methods may be used to support write-in candidates while preserving ballot secrecy. For example, a shuffling mechanism may be used to shuffle encrypted ballot variants 1200 before tallying is performed, thus removing the association between encrypted ballot variants 1200 and the voters that cast said encrypted ballot variants 1200. A distributed or onion encryption network may be used during said shuffling. Alternatively, ballot secrecy may be partially sacrificed by including the plaintext version of write-in candidates in encrypted ballot variants 1200 that are posted to the bulletin board 900.

Once the ballot adjudication step 1401 completes, election officials 1008 direct the election official computer 1006 to proceed to step 1403. Step 1403 comprises the election official computer 1006 obtaining all encrypted ballot variants 1200 that were published to the bulletin board 900, and that were not marked as invalid during ballot adjudication 1401.

After completing step 1403, election officials 1008 direct the election official computer 1006 to proceed to step 1405. Step 1405 comprises extracting the encrypted ballot selections 1201 from the encrypted ballot variants 1200 obtained during step 1403. The encrypted ballot selections 1201 are sorted by the associated options 1105 at this time. Encrypted ballot selections 1201 are stored in encrypted ballot variants 1200 in hashmap format: each encrypted ballot variant 1200 has a single hashmap, wherein the hashmap keys are ballot options 1105 and the hashmap values are encrypted ballot selections 1201. To sort the encrypted ballot selections 1201 by ballot options 1105, the hashmaps containing the encrypted ballot selections 1201 are first extracted from the encrypted ballot variants 1200 (specifically, the variants 1200 obtained during step 1403). The key-value pairs in each hashmap are then iterated through, and each value (which is an encrypted ballot selection 1201) is placed in a list labeled with the associated key (which is a ballot option 1105).

An example is now presented of the sorting process undertaken in step 1405. Suppose two valid encrypted ballot variants 1200 were published to the bulletin board 900. Suppose further that both encrypted ballot variants 1200 contain hashmaps with four keys, and the first encrypted ballot variant 1200 contains the same keys as the second encrypted ballot variant 1200. Suppose further that the five keys each represent a different ballot option 1105: the first key contains the option 1105 "Yes" for a first ballot item 1101, the second key contains the option 1105 "No" to the first ballot item 1101, the third key contains the option 1105 "John Smith" to a second ballot item 1101, the fourth key contains the option 1105 "Writein Candidate 1" to the second ballot item 1101, and the fifth key contains the option 1105 "Writein Candidate 2" to the second ballot item 1101. In this example, five lists would be created: one labeled with the "Yes" option 1105, one labeled with the "No" option 1105, one labeled with the "John Smith" option 1105, one labeled with the "Writein Candidate 1" option 1105, and one labeled with the "Writein Candidate 2" option 1105. Because two valid encrypted ballot variants 1200 were published to the bulletin board 900, and each encrypted ballot variant 1200 has an encrypted ballot selection 1201 for each ballot option 1105, each of the aforementioned lists contains two encrypted ballot selection 1201. Specifically, each of the aforementioned lists contains the encrypted ballot selection 1201 associated with the lists' labeled option 1105 in the first encrypted ballot variant's 1200 hashmap, and the encrypted ballot selection 1201 associated with the lists' labeled option 1105 in the second encrypted ballot variant's 1200 hashmap.

After the completion of step 1405, election officials 1008 direct the election official computer 1006 to proceed to step 1407, which first comprises applying a sum operation to each list of encrypted ballot selections 1201 obtained during step 1403 (wherein each list contains the encrypted ballot selections 1201 for a specific option 1105). Each sum operation yields an encrypted tally 905 for an option 1105. Each encrypted tally 905 is then published to the bulletin board 900, along with the option 1105 associated with the list used to calculate said encrypted tally 905.

After the completion of step 1407, election officials 1008 direct the election official computer 1006 to proceed to step 1409, which first comprises decrypting the encrypted tallies 905 generated during step 1407. In the first embodiment of the method 100, the decryption is performed using the private key 1401*b* of the election official keypair. In alternative embodiments of the method 100, the decryption may be performed using any alternative credentials used to encrypt the encrypted ballot selections 1201. The decrypted tallies 907 are then published to the bulletin board 900. The election official computer 1006 then generates tally decryption proofs 909 to prove that each decrypted tally 907 is a valid decrypted representation of an encrypted tally 905. Each decryption proof 909 is a zero-knowledge proof that can be verified by anyone who possesses the proof and the election official public key 1401*a* (which is distributed widely prior to the start of an election). Decryption proofs 909 are generated using the properties of the encryption algorithm used to encrypt encrypted ballot selections 1201 (the Paillier algorithm, in the first embodiment of the method 100). The decryption proofs 909 are then published to the bulletin board 900.

The completion of step 1409 typically results in the completion of post-election step 107. However, in certain cases, it may be desirable to perform a paper recount 1411. The paper recount step 1411 begins with election officials 1008 obtaining the plaintext ballot variant 1300 receipts that were deposited into the physical ballot boxes 605a during voting 105. Receipt validity audits 1601 are then performed on the plaintext ballot variant 1300 receipts, and the ballot selections 1103 on the plaintext ballot variant 1300 receipts are tallied together. The tallying process comprises starting with a sum of zero for each ballot option 1105, and incrementing said sum whenever a ballot selection 1103 on a plaintext ballot variant 1300 receipt is observed for said ballot option 1105. The final tallies are then widely distributed to the public. The paper recount 1411 step may be performed offline, or with the assistance of the election official computer 1006.

The election method 100 may comprise the use of one or more privileged auditors 1005, privileged auditor computers 1003, election officials 1008, election official computers 1006, public auditor computers 1001, bulletin board computers 900, receipt scanner computers 700, and/or voting booth computers 600 (hereafter referred to as election participants). A reference to an election participant in the singular does not imply that only one of said election participant may participate in the election method 100.

No blockchains are used to execute the first embodiment of the election method 100; all data is transferred between election participants without the use of a blockchain. The lack of a blockchain in the election method 100 allows the election method 100 to operate with less computing, memory, and networking resources than blockchain-based methods, because the overhead incurred by blocks is removed. Alternative embodiments may comprise the use of a blockchain if a blockchain can be used in a manner that does not require excessive computing, memory, and networking resources.

The election method 100 is user friendly and allows voters to detect fraud and/or tampering via receipt validity audits 1601. In the first embodiment of the method 100, voters only need to interact with a voting booth 600, receipt scanner 700, and possibly a pollworker, thus ensuring that the system is easy for voters to use. However, in alternative embodiments of the method 100, voters may interact with other individuals and machines; user friendliness may be considered in the design of said alternative embodiments.

FIG. 6 depicts a first embodiment of the voting booth 600. The voting booth 600 comprises voter communication interfaces including a touchscreen 601, a receipt printer 603, a glass viewing pane 605, a receipt output slot 605b, an electronic braille interface 609, a speaker and microphone 611, and a physical button interface 617. Alternative embodiments of the voting booth 600 may include additional voter communication interfaces to ensure that all voters can effectively communicate with the voting booth 600, regardless of any disabilities or impairments. The voting booth also comprises a physical ballot box 605a, where plaintext ballot variants 1300 for confirmed ballots 1100 are deposited. The physical ballot box 605a may be retrieved by election officials 1008 for paper recounts 1411, or by privileged auditors 1005 for random audits. The voting booth 600 also comprises a security alarm 607, which is activated upon physical tampering of the voting booth 600. If the voting booth 600 is physically tampered with by an adversary, security personnel may be called to the voting booth 600 to address the threat. The voting booth 600 also comprises a help button 613 which may be activated by the voter to summon a pollworker. The pollworker may assist the voter with operating the voting booth 600. Some embodiments of the voting booth 600 are designed to ensure that pollworkers can assist voters with the voting process without compromising ballot secrecy. The voting booth 600 also comprises a network connectivity interface 615. In the first embodiment of the voting booth 600, the network connectivity interface 615 is an ethernet port. In alternative embodiments of the voting booth 600, the network connectivity interface 615 may be any interface that allows the voting booth 600 to connect to the bulletin board 900, such as a cellular network connection or a WiFi connection. The voting booth 600 also comprises a power port 621 to provide the voting booth 600 with electrical power; in the first embodiment of the voting booth 600, the power port 612 is a USB port. In alternative embodiments of the voting booth 600, the power port 612 may be any electrical connection. In the first embodiment of the voting booth 600, the voting booth 600 also has access to the election official public key 1401a, which is used to generate encrypted ballot selections 1201. In alternative embodiments of the voting booth 600, the voting booth 600 may have access to the keys or credentials associated with alternative methods used to generate encrypted ballot selections 1201.

FIG. 7 depicts a first embodiment of the receipt scanner 700. The receipt scanner 700 comprises voter communication interfaces including a touchscreen 701, an electronic braille interface 705, a speaker and microphone 707, and a physical button interface 711. Alternative embodiments of the receipt scanner 700 may include additional voter communication interfaces to ensure that all voters can effectively communicate with the receipt scanner 700, regardless of any disabilities or impairments. The receipt scanner 700 also comprises a barcode and optical character recognition (OCR) scanner 703, which scans ballot receipts printed by the voting booth 600. The receipt scanner 700 also comprises a security alarm 713, which is activated upon physical tampering of the receipt scanner 700. If the receipt scanner 700 is physically tampered with by an adversary, security personnel may be called to the receipt scanner 700 to address the threat. The receipt scanner 700 also comprises a help button 709 which may be activated by the voter to summon a pollworker. The pollworker may assist the voter with operating the receipt scanner 700. The receipt scanner 700 also comprises a network connectivity interface 715. In the first embodiment of the receipt scanner 700, the network connectivity interface 715 is an ethernet port. In alternative embodiments of the receipt scanner 700, the network connectivity interface 715 may be any interface that allows the receipt scanner 700 to connect to the bulletin board 900 and to the public auditor computer 1001, such as a cellular network connection or a WiFi connection. The receipt scanner 700 also comprises a power port 717 to provide the receipt scanner 700 with electrical power; in the first embodiment of the receipt scanner 700, the power port 717 is a USB port. In alternative embodiments of the receipt scanner 700, the power port 717 may be any electrical connection. In the first embodiment of the receipt scanner 601, the receipt scanner 601 also has access to the election official public key 1401a, which is used to generate encrypted ballot selections 1201. In alternative embodiments of the receipt scanner 601, the receipt scanner 601 may have access to the keys or credentials associated with alternative methods used to generate encrypted ballot selections 1201.

FIG. 8 depicts a first embodiment of the smartcard 800. The first embodiment of the smartcard 800 comprises electronic contacts 803 that can be used to communicate with the voting booth 600, voter identifying information 805 that is visibly displayed on the card, a computer 811 that can perform computational operations such as cryptographic operations, and a voter keypair and voter Personal Identification Number (PIN) 809 that can be used to authenticate the voter. Alternative embodiments of the smartcard 800 may comprise alternative means of communicating with the voting booth 600, such as near-field communication (NFC) apparatus, instead of the electronic contacts 803. Alternative embodiments of the smartcard 800 may comprise alternative means of authenticating the voter, such as a password or biometric data. Alternative embodiments of the smartcard 800 may not comprise visible voter identifying information 805 for privacy reasons.

FIG. 9 depicts a first embodiment of the bulletin board 900. The bulletin board 900 allows content to be posted by a first set of authorized users, including voting booths 600 and election official computers 1006. Content posted to the bulletin board 900 may be viewed by a second set of authorized users. In the first embodiment of the bulletin board 900, the second set of authorized users includes the public, such that any interested parties may view the bulletin board 900 without special authorization. In alternative embodiments of the bulletin board 900, the second set of authorized users may be restricted to specific authorized users, such as privileged auditors 1005 and election officials 1008. The first embodiment of the bulletin board 900 is implemented by a web server. Alternative embodiments of the bulletin board 900 may be implemented by FTP servers, Telnet servers, or other servers that allow for authenticating users and storing and retrieving data. Content posted to the bulletin board includes encrypted ballot variants 901, plaintext ballot variants 903, encrypted tallies 905, decrypted tallies 907, tally decryption proofs 909, valid voter public keys 807*a*, and registration material hashes 913. Search functionality is provided by the bulletin board 900, such that encrypted ballot variants 901 and plaintext ballot variants 903 with specific ballot IDs 1205 can be found efficiently. The search functionality may be provided with the use of a database, a data store, or an index. The bulletin board 900 returns an error response if a search cannot be fulfilled (for example, if no results are available).

Figure 10:
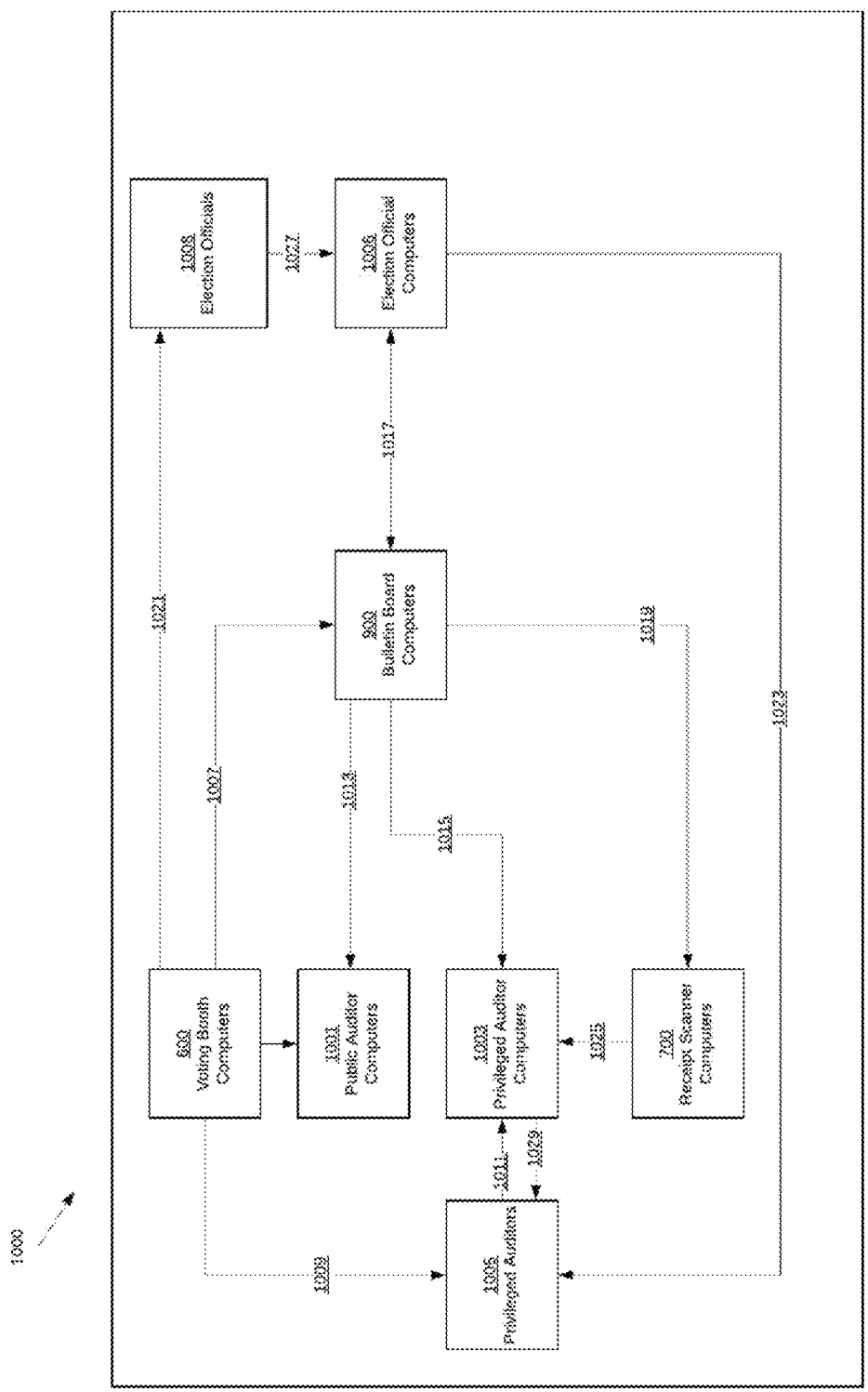
FIG. 10 depicts a first embodiment of the election system.

FIG. 10 depicts a first embodiment of the election system 1000. The election system 1000 comprises one or more privileged auditors 1005, one or more privileged auditor computers 1003, one or more election officials 1008, one or more election official computers 1006, one or more public auditor computers 1001, one or more bulletin board computers 900, one or more receipt scanner computers 700, and one or more voting booth computers 600 (hereafter referred to as election participants). Voting booth computers 600 are embodiments of the voting booth 600; receipt scanner computers 700 are embodiments of the receipt scanner 700. Election participants electronically communicate with each-other over a computer network such as a Wide Area Network (WAN), Local Area Network (LAN), the Internet, or any other computer network. Election participants may also physically communicate with each-other over a physical medium such as physical mail or a scanner.

In the first embodiment of the election system 1000, voting booth computers 600 electronically communicate with bulletin board computers 900 via communication 1007. Communication 1007 allows voting booth computers 600 to publish confirmed or spoiled ballots 1100 during step 105.

In the first embodiment of the election system 1000, voting booth computers 600 physically communicate with privileged auditors 1005 via communication 1009. Communication 1009 allows privileged auditors 1005 to receive and process audit plaintext ballot variant 1300 receipts during privileged audits 1603.

In the first embodiment of the election system 1000, privileged auditors 1005 physically scan plaintext ballot variant 1300 receipts into privileged auditor computers 1003 via communication 1011. Communication 1011 allows privileged auditor computers 1003 to audit plaintext ballot variant 1300 receipts during privileged audits 1603.

In the first embodiment of the election system 1000, bulletin board computers 900 electronically communicate with public auditor computers 1001 via communication 1013. Communication 1013 allows public auditor computers 1001 to audit plaintext ballot variants 1300 and encrypted ballot variants 1200 during public audits 1605.

In the first embodiment of the election system 1000, bulletin board computers 900 electronically communicate with privileged auditor computers via communication 1015. Communication 1015 allows privileged auditor computers 1003 to audit plaintext ballot variants 1300 and encrypted ballot variants 1200 during privileged audits 1603.

In the first embodiment of the election system 1000, bulletin board computers 900 electronically communicate with election official computers 1006 via communication 1017. Communication 1017 allows election official computers 1006 to retrieve encrypted ballot variants 1200 from the bulletin board 900 for tally generation during step 107.

In the first embodiment of the election system 1000, bulletin board computers 900 electronically communicate with receipt scanner computers 700 via communication 1019. Communication 1019 allows receipt scanner computers 700 to audit plaintext ballot variants 1300 and encrypted ballot variants 1200 during receipt validity audits 1601. In alternative embodiments of the election system 100, communication 1019 may be extended to support electronic communication with other computers or individuals that wish to perform receipt validity audits 1601 (i.e. voters' mobile phones or personal computers).

In the first embodiment of the election system 1000, voting booth computers 600 physically communicate with election officials 1008 via communication 1021. Communication 1021 allows election officials 1008 to receive and process audit plaintext ballot variant 1300 receipts in the case of a paper recount 1411.

In the first embodiment of the election system 1000, election officials 1008 physically communicate with privileged auditors 1005 via communication 1023. Communication 1023 allows privileged auditors 1005 to receive voter registration materials for privileged audits 1603.

In the first embodiment of the election system 1000, receipt scanner computers 700 electronically communicate with privileged auditor computers 1003 via communication 1025. Communication 1025 allows privileged auditor computers 1003 to be notified of failed receipt validity audits 1605. Privileged auditor computers 1003 can then handle the receipt validity audits 1605, optionally notifying privileged auditors via communication 1029.

In the first embodiment of the election system 1000, election officials 1008 physically scan plaintext ballot variant 1300 receipts into election official computers 1006 via communication 1027. Communication 1027 allows election official computers 1006 to aid with paper recounts 1411.

FIG. 11 depicts a first embodiment of the ballot 1100. Each ballot 1100 comprises a list of ballot items 1101. Each ballot item 1101 represents a choice that the voter is asked to make; for example, the voter may be asked to answer a "Yes"/"No" question, choose a candidate for a presidential election, or answer any other question that can be presented on a ballot 1100. Each ballot item 1101 is associated with a list of ballot options 1105 that the voter may choose from (such as a list of candidates running for a governmental office), and may also comprise a write-in option. When a voter fills in their ballot 1100, the voter's selections are filled in as ballot selections 1103 (either immediately if the ballot 1100 is submitted via the voting booth 600, or when the ballot 1100 is otherwise processed by election officials 1008).

FIG. 12 depicts a first embodiment of the encrypted ballot variant 1200. Each encrypted ballot variant 1200 comprises voter identifying information 805 such as a voter identification number; voter identifying information 805 generally only includes anonymous identifiers. Each encrypted ballot variant 1200 comprises one or more encrypted ballot selections 1201, stored in hashmap format. Each encrypted ballot variant 1200 has a single hashmap, wherein the hashmap keys are ballot options 1105 and the hashmap values are encrypted ballot selections 1201. Each encrypted ballot selection 1201 comprises an encrypted value indicating whether the voter selected the ballot option 1105 (i.e. an encrypted zero or one). In the first embodiment of the encrypted ballot variant 1200, the encrypted values enclosed in encrypted ballot selections 1201 are generated via homomorphic encryption. Measures may be taken to ensure that each encrypted ballot selection 1201 has a unique encrypted value, even if the decrypted values are not unique (for example, salts or padding may be added). Each encrypted ballot variant 1200 also comprises a digital signature 1203; the digital signature 1203 is a valid digital signature of the voter identifying information 805 and encrypted ballot selections 1201. The digital signature 1203 is typically generated by the smartcard 800 of the voter identified by the voter identifying information 805 (i.e. using the private key 807b of the voter keypair enclosed in the smartcard 800). However, in certain cases, the digital signature 1203 may be generated by different authorities, or may not be included in the encrypted ballot variant 1200 at all. For example, ballots 1100 received via alternative voting mechanisms may be digitally signed using the private key 1401b of the election official keypair. Likewise, if alternative means are used to authenticate voters (such as passwords, symmetric encryption keys, or photo identifications), no digital signatures 1203 are included in the encrypted ballot variant 1200. Each encrypted ballot variant 1200 also comprises a ballot ID 1205, which is a hash of the data enclosed in the encrypted ballot variant 1200 (other than the ballot ID 1205 itself).

FIG. 13 depicts a first embodiment of the plaintext ballot variant 1300. The plaintext ballot variant 1300 first comprises an encrypted ballot 1200 and a ballot 1100. The plaintext ballot variant 1300 also comprises a series of decryption proofs 1301. The decryption proofs 1301 prove that the encrypted ballot selections 1201 in the enclosed encrypted ballot variant 1200 accurately represent the ballot selections 1103 in the enclosed ballot 1100. Specifically, for each ballot option 1105 in the enclosed ballot 1100 that was not selected by the voter (and was thus not included in a ballot selection 1103 in the ballot 1100), the decryption proof 1301 should prove that the encrypted ballot selection 1301 that maps to the ballot option 1105 (in the enclosed encrypted ballot variant's 1301 hashmap) contains an encrypted representation of the number zero. Likewise, for each ballot option 1105 in the enclosed ballot 1100 that was selected by the voter (and was thus included in a ballot selection 1103 in the ballot 1100), the decryption proof 1301 should prove that the encrypted ballot selection 1301 that maps to the ballot option 1105 (in the enclosed encrypted ballot variant's 1301 hashmap) contains an encrypted representation of the number one. Each decryption proof 1301 is a zero-knowledge proof that can be verified by anyone who possesses the proof and the election official public key 1401a (which may be distributed widely prior to the start of an election). Decryption proofs 1301 are generated using the properties of the encryption algorithm used to encrypt encrypted ballot selections 1201 (the Paillier algorithm, in the first embodiment of the method 100).

Ballots 1100, encrypted ballot variants 1200, plaintext ballot variants 1300, and any other data structures described in this disclosure are represented on a computer via program classes, such as C++ classes. When certain values are associated with other values, a hashmap is used to record the associations. For example, when an encrypted ballot selection 1201 is associated with a ballot option 1105, a hashmap is employed wherein the hashmap keys are ballot options 1105 and the hashmap values are encrypted ballot selections 1201. In alternative embodiments, alternative data structures may be used, such as lists, arrays, vectors, or trees.

When ballots 1100, encrypted ballot variants 1200, plaintext ballot variants 1300, and any other data structures described in this disclosure are printed onto physical representations or receipts, the enclosed data is represented in human-readable text (such as tables with ASCII characters) and machine-readable text (such as QR codes or other barcodes).

FIG. 2 depicts a first embodiment of the post-election step 107.

Figure 3:
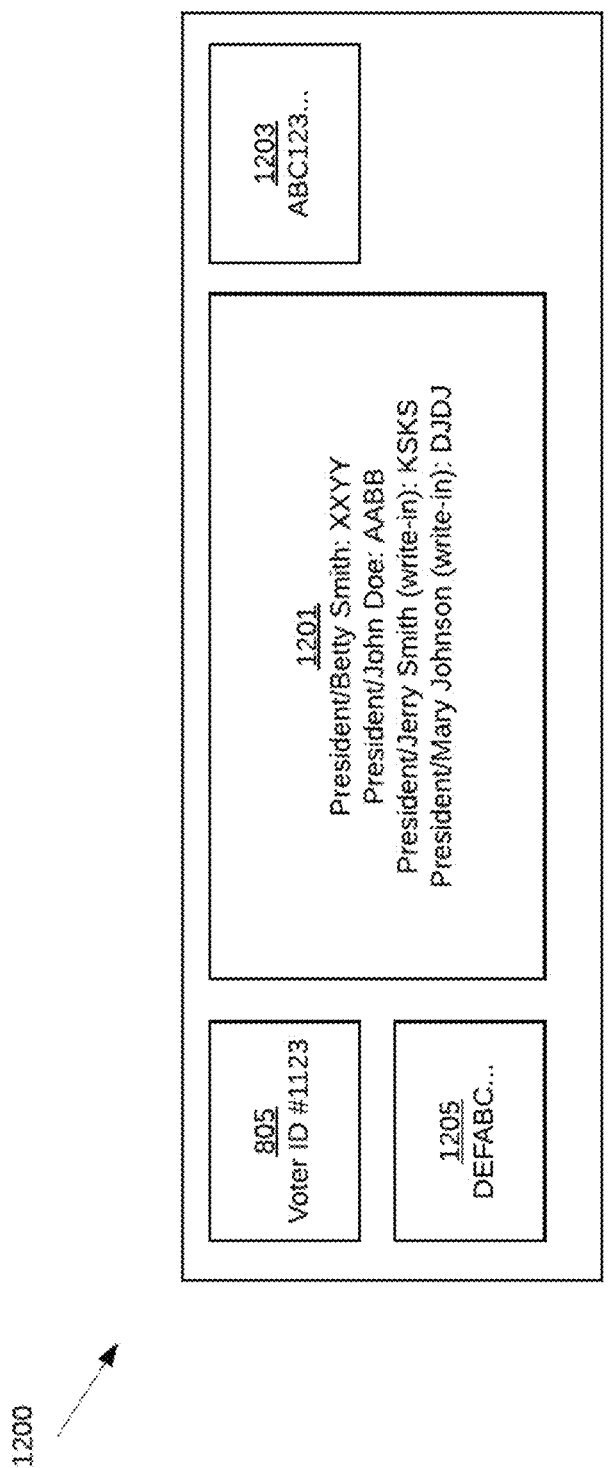
FIG. 3 depicts an example of the first embodiment of the encrypted ballot variant.

FIG. 3 depicts an example of a encrypted ballot variant 1200 that could be generated during the first embodiment of the election method 100. The voter identifying information 805 contains a voter identification number. The digital signature 1203 contains a digital signature of the encrypted ballot variant 1200 data (other than the ballot ID 1205). The ballot ID 1205 contains a hash of the encrypted ballot variant 1200 data (other than the ballot ID 1205). The encrypted ballot selections 1201 comprise four encrypted ballot selections 1201: two for regular candidates and two for write-in candidates. One of the encrypted ballot selections 1201 in FIG. 3 contains a homomorphically encrypted representation of the number one; the remaining encrypted ballot selections 1201 in FIG. 3 contain a homomorphically encrypted representation of the number zero. If the voter voted for the write-in candidate "Jerry Smith", for example, the value "KSKS" would be a homomorphically encrypted representation of the number one, and all of the other encrypted ballot selections 1201 would be homomorphically encrypted representation of the number zero. Likewise, if the voter voted for the regular candidate "Betty Smith", for example, the value "XXYY" would be a homomorphically encrypted representation of the number one, and all of the other encrypted ballot selections 1201 would be homomorphically encrypted representation of the number zero.

Figure 4:
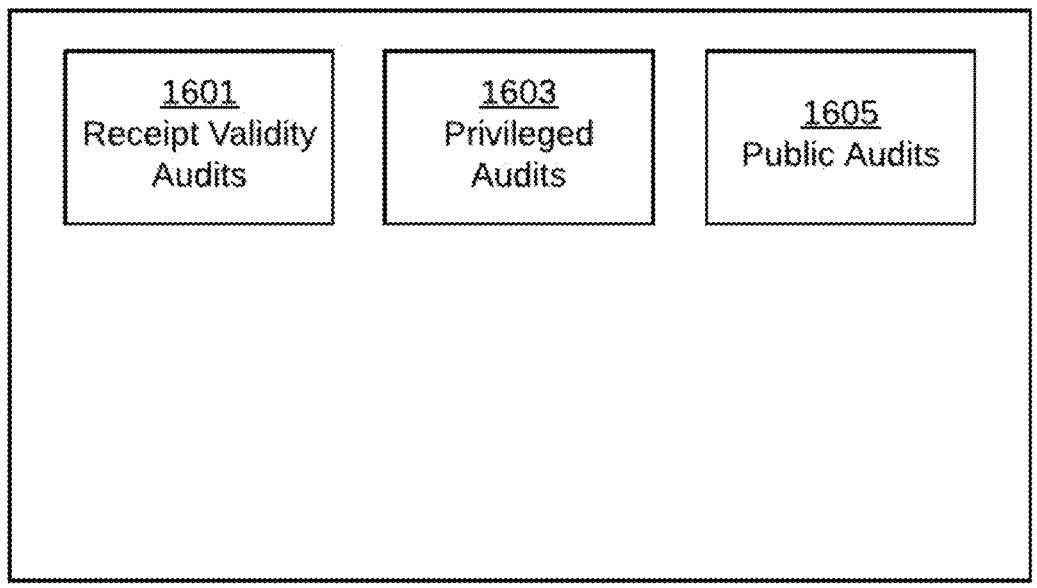
FIG. 4 depicts a first embodiment of the election method audits.

FIG. 4 depicts the various audits that are performed during the the first embodiment of the election method 100. These audits allow voters, privileged auditors 1005, and public auditors to detect fraud, even if other election participants are corrupt. Each of these audits are methods performed by auditors.

Receipt validity audits 1601 are performed on physical representations (i.e. receipts) of plaintext ballot variants 1300 and encrypted ballot variants 1200.

Receipt validity audits 1601 comprise a verification that the ballot ID 1205 in a receipt's encrypted ballot variant 1200 is a valid hash of the data enclosed in the encrypted ballot variant 1200 (other than the ballot ID 1205 itself). This verification is performed by hashing the encrypted ballot variant 1200 data, other than the ballot ID 1205 itself, and verifying that the resulting hash matches the ballot ID 1205 on the receipt.

Receipt validity audits 1601 comprise a verification that, if a receipt comprises an encrypted ballot variant 1200 but does not comprise a plaintext ballot variant 1300, the encrypted ballot variant 1200 was published to the bulletin board 900. This verification is performed by sending the ballot ID 1205 on the receipt to the bulletin board 900, requesting the encrypted ballot variant 1200 with said ID 1205 from the bulletin board 900, and verifying that the bulletin board does not return an error response.

Receipt validity audits 1601 comprise a verification that, if a receipt comprises a plaintext ballot variant 1300 and the receipt is presented for audit by a voter, the plaintext ballot variant 1300 was published to the bulletin board. This verification is performed by sending the ballot ID 1205 on the receipt to the bulletin board 900, requesting the plaintext ballot variant 1300 with said ID 1205 from the bulletin board 900, and verifying that the bulletin board does not return an error response.

Receipt validity audits 1601 comprise a verification that that, if a receipt comprises a plaintext ballot variant 1300 and the receipt is not presented during a paper recount 1411, the ballot selections 1103 on the enclosed ballot 1100 match the voter's true intentions. In the first embodiment of the receipt validity audits 1601, this verification is performed by displaying the ballot selections 1103 on the receipt to the voter on the receipt scanner's 700 touchscreen 701, and asking the voter to press a button to verify their selections 1103. In alternative embodiments of the receipt validity audits 1061, this verification may be performed with alternative interfaces such as website graphical user interfaces.

Receipt validity audits 1601 comprise a verification that, if a receipt comprises a plaintext ballot variant 1300 and the receipt is presented during a paper recount, the encrypted ballot variant 1200 enclosed in the plaintext ballot variant 1300 was published to the bulletin board. This verification is performed by sending the ballot ID 1205 on the receipt to the bulletin board 900, requesting the encrypted ballot variant 1200 with said ID 1205 from the bulletin board 900, and verifying that the bulletin board does not return an error response.

Receipt validity audits 1601 comprise a verification that, if a receipt comprises a plaintext ballot variant 1300, the decryption proofs 1301 are valid. This verification is performed by validating the decryption proofs 1301 using the properties of the homomorphic encryption algorithm used to encrypt encrypted ballot selections 1201 (the Paillier algorithm, in the first embodiment of the method 100).

Receipt validity audits 1601 comprise a verification that, if a receipt is presented by a voter, the voter identifying information 805 on the receipt matches the voter identifying information 805 on the voter's smartcard 800. In the first embodiment of the receipt validity audits 1601, this verification is performed by displaying the voter identifying information 805 on the receipt to the voter on the receipt scanner's 700 touchscreen 701, and asking the voter to press a button to verify that the information matches their smartcard 800. In alternative embodiments of the receipt validity audits 1061, this verification may be performed with alternative interfaces such as website graphical user interfaces.

Receipt validity audits 1601 comprise a verification that, if a voter possesses multiple receipts, the ballot IDs 1205 are unique amongst the receipts. This verification is performed via the receipt scanners storing the ballot IDs 1205 they observe, and verifying that no ballot IDs 1205 are observed twice unexpectedly. It is expected to observe ballot IDs 1205 twice in some cases; for example, in the event of a paper recount 1411. It is unexpected to observe ballot IDs 1205 twice in other cases; for example, if a voter presents a plaintext ballot variant 1300 receipt and an encrypted ballot variant 1200 receipt for audit, those receipts should have differing ballot IDs 1205.

If any verifications performed during the receipt validity audits 1601 by the receipt scanner 700 fail, privileged auditor computers 1003 (and by extension, privileged auditors 1005) are notified.

Privileged audits 1603 are performed by privileged auditors 1005 and privileged auditor computers 1003. Privileged auditors 1005 may also serve as public auditors, and privileged auditor computers 1005 may also serve as public auditor computers 1001.

Privileged audits 1603 comprise an audit of voter registration. In order to prevent election officials 1008 from allowing ineligible voters to vote or otherwise falsifying voter registrations, privileged auditors 1005 choose a sample (possibly a random sample) of voter public keys 807a posted to the bulletin board 900. Election officials 1008 provide the registration materials for the selected voter public keys 807a to the privileged auditors 1005. Privileged auditors 1005 then verify that the registration materials match the registration material hashes 913 posted to the bulletin board 900, and that the registration materials are valid. For example, if registration materials include passports, privileged auditors 1005 verify the validity of the passports. The verification of registration material hashes 913 is performed by the public auditor computers 1001.

Privileged audits 1603 also comprise an audit of encrypted ballot variants 901 published to the bulletin board. In order to prevent the voting booth 600 from committing fraud, privileged auditors 1005 choose a sample (possibly a random sample) of published encrypted ballot variants 1200, and fetch the associated plaintext ballot variant 1300 receipts from the physical ballot boxes 605a of the voting booths 600 that published the encrypted ballot variants 1200. For each selected encrypted ballot variant 1200, the plaintext ballot variant 1300 receipt with the same ballot ID 1205 as the encrypted ballot variant 1200 is fetched. Privileged auditors 1005 then perform receipt validity audits 1601 on the plaintext ballot variant 1300 receipts.

Privileged audits 1603 also comprise an audit of plaintext ballot variant 1300 receipts. A sample (possibly a random sample) of plaintext ballot variant 1300 receipts is selected from the physical ballot boxes 605a of the voting booths 600. Privileged auditors 1005 then perform receipt validity audits 1601 on the plaintext ballot variant 1300 receipts.

Privileged audits 1603 also comprise an audit of ballot adjudication 1401. A sample (possibly a random sample) of ballots 1100 processed during ballot adjudication 1401 is selected. Election officials 1008 provide the associated ballots' 1100 materials to the privileged auditors 1005. For example, if paper ballots 1100 are received by mail, election officials 1008 provide copies of the paper ballots 1100 to privileged auditors 1005. Privileged auditors 1005 then verify that the ballots 1100 were correctly marked as valid or invalid, and that conflicting ballots submitted by the same voter were handled according to the ballot priority rules.

Privileged audits 1603 also comprise an audit of paper recounts 1411. In the event of a paper recount 1411, privileged auditors 1005 will mirror and validate the work of election officials 1008.

If any verifications performed during the privileged audits 1603 fail, privileged auditors 1005 take corrective measures. These corrective measures may include a paper recount or an election do-over.

Public audits 1605 are performed by public auditor computers 1001. Public auditor computers 1001 may be run by any member of the public, such as non-profits or interested voters.

Public audits 1605 comprise a verification of the digital signature 1203 of each plaintext ballot variant 1300 and encrypted ballot variant 1200 that is published to the bulletin board 900. Digital signatures 1203 for ballots 1100 received via the voting booth 600 are validated by public auditor computers 1001 using the voter public keys 807a, which are publically available on the bulletin board 900. Digital signatures 1203 for ballots 1100 received via alternative voting mechanisms can be validated using the election official public key 1401a, which is also publicly available on the bulletin board 900.

Public audits 1605 also comprise a verification that only one valid encrypted ballot variant 1200 is published for each voter. This audit is performed by public auditor computers 1001 with a simple analysis of the bulletin board 900; it is immediately apparent if multiple valid encrypted ballot variants 1200 are published with the same voter identifying information 805. It is acceptable if multiple encrypted ballot variants 1200 are published for a single voter, as long as all except for one are marked as invalid during ballot adjudication 1401.

Public audits 1605 also comprise a verification that each encrypted tally 905 published to the bulletin board 900 is valid. To perform this verification, public auditor computers 1001 generate their own encrypted tallies 905 using the information on the bulletin board 900, and validate that this custom encrypted tally 905 matches the published encrypted tally 905. Public auditors 1605 also validate the decryption proofs 909 for each published encrypted tally 905 at this point, using the properties of the homomorphic encryption algorithm used to encrypt encrypted ballot selections 1201 (the Paillier algorithm, in the first embodiment of the method 100).

Public audits 1605 also comprise a verification that, once an encrypted ballot variant 1200 or plaintext ballot variant 1300 is published to the bulletin board 900, the published data is not changed unexpectedly. It is expected for published data to change in some cases; for example, some encrypted ballot variants 1200 may be labeled as invalid during ballot adjudication 1401. It is unexpected for published data to change in other cases; for example, encrypted ballot variants 1200 should not be removed from the bulletin board 900 entirely.

If any verifications performed during the public audits 1605 fail, public auditors call for corrective measures. These corrective measures may include a paper recount or an election do-over.

Figure 14:
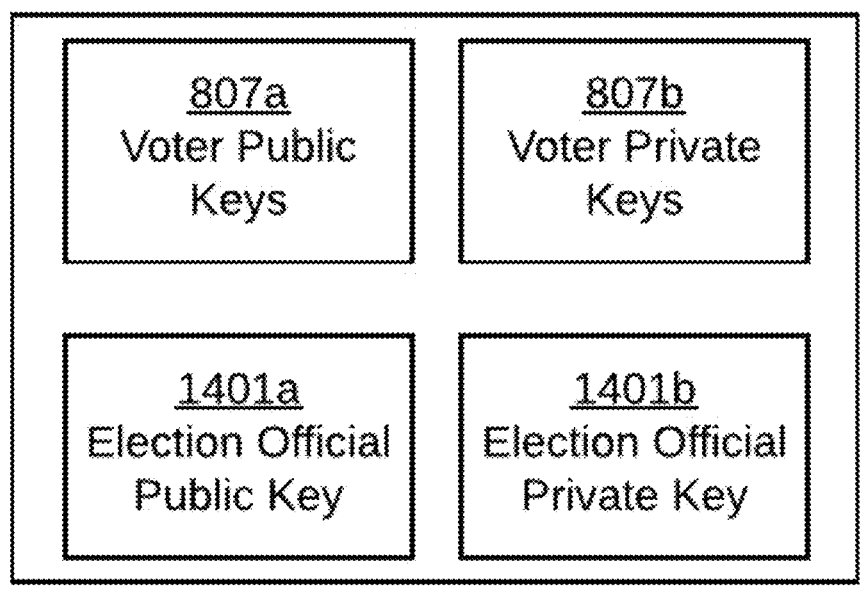
FIG. 14 depicts a first embodiment of the cryptographic keys of the election system.

FIG. 14 depicts a first embodiment of the cryptographic keys used by the election method 100 and election system 1000. The cryptographic keys comprise an election official public key 1401a, an election official private key 1401b, voter public keys 807a, and voter private keys 807b. Each keypair may be replaced by alternative authentication mechanisms, such as passwords or symmetric keys, and the election method 100 and election system 1000 may be adjusted to support said replacements. In some embodiments of the election method 100 and election system 1000, the cryptographic keys depicted in FIG. 14 may in fact be represented by several cryptographic keys (for example, several election official public keys 1401a may be used).

Figure 5:
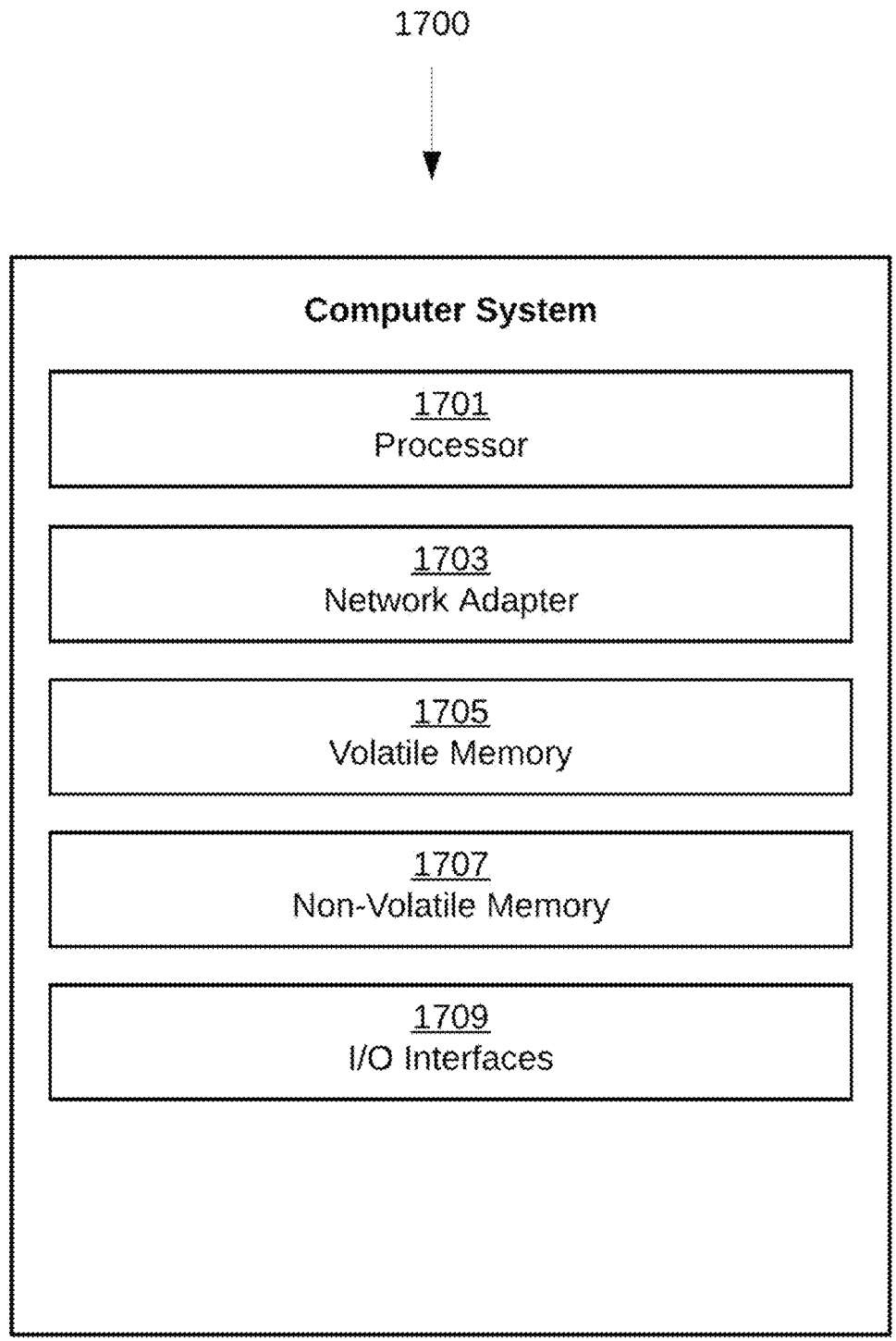
FIG. 5 depicts a first embodiment of the computer system.

FIG. 5 illustrates a schematic of an example computer system 1700 that may implement any portion of the privileged auditor computers 1003, election official computers 1006, public auditor computers 1001, bulletin board computers 900, receipt scanner computers 700, and/or voting booth computers 600. The computer system 1700 may comprise one or more processors 1701, a network adapter 1703, a volatile memory 1705, a non-volatile memory 1707, and one or more I/O interfaces 1709. The processor 1703 may comprise a software module that performs the methods described herein. The software module may comprise computer instructions that perform the methods described herein. Said software module may be programmed into the integrated circuits of the processor 1703, or loaded from memory 1705, 1707 or a computer network or combinations thereof. The computer system 1700 can communicate with one or more computer networks via its network adapter 1704. The computer system 1701 can communicate with networks such as local area networks (LAN), general wide area networks (WAN), and/or public networks (e.g., the Internet) via its network adapter 1703. The volatile memory 1705 may comprise any volatile computer system 1700 readable media such as random access memory (RAM). The non-volatile memory 1707 may comprise any non-volatile computer system readable media such as a hard drive (HDD) or solid-state drive (SSD). The I/O interfaces 1709 may comprise one or more of a Light Emitting Diode, a digital display, a printer, a keyboard, a mouse, a touchscreen, or any other devices that allow for information to be inputted into and retrieved from the computer system 1701.

Examples of well-known computer systems 1701 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, distributed cloud computing environments that include any of the preceding systems or devices, and in general any type of computing device.

Processors 1703 may be implemented by hardware processors including Central Processing Units (CPUs), Graphics Processing Units (GPUs), or any other processors that allow for the execution of computer program instructions that complete the methods described herein.

Any combination of one or more computer readable medium(s) 1705, 1707 may be utilized by the computer system 1700. A computer readable medium 2305, 2307 may be a computer readable storage medium 1705, 1707. A computer readable medium 1705, 1707 may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium 1705, 1707 would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium 1705, 1707 may be any tangible medium that can contain, or store a program for use by or in connection with an instruction execution system, apparatus, or device.

Computer program instructions embodied on a computer readable medium may be transmitted using any appropriate medium, including but not limited to wireless, wireline, optical fiber cable, RF, etc., or any suitable combination of the foregoing.

Computer program instructions for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog, and/or low-level languages such as assembly. Privileged auditor computers 1003, election official computers 1006, public auditor computers 1001, bulletin board computers 900, receipt scanner computers 700, and/or voting booth computers 600 may contain computer program instructions to execute the methods described herein.

Aspects of the disclosed embodiments may be embodied as a system, method, or computer program product or apparatus. Accordingly, aspects of the disclosed embodiments may take the form of an entirely hardware embodiment, an entirely software embodiment (including firmware, resident software, micro-code, or computer program instructions) or an embodiment combining software and hardware aspects that may all generally be referred to herein as a "circuit," "module" or "system." Furthermore, aspects of the disclosed embodiments may take the form of a computer program product embodied in one or more computer readable medium(s) 2305, 2307 having computer program instructions embodied thereon. These computer program instructions may be provided to a processor 1703 of a general purpose computer, special purpose computer, or other programmable data processing apparatus to produce a machine, such that the instructions, which execute via the processor 1703 of the computer system 2301 or other programmable data processing apparatus, create means for implementing the systems or methods described herein.

Computer program instructions may be secured via the use of a Trusted Platform Module (TPM). A TPM can be used to cryptographically attest that the said program, software, or computer program instructions are valid and have not been modified by an unauthorized third party (i.e. malware). Non-limiting examples of TPM include the TPM described in ISO standard ISO/IEC 11889, TPM 1.2, TPM 2.0, or any other hardware devices that cryptographically attest to the validity of software.

The flowchart and block diagrams in the figures illustrate the architecture, functionality, and operation of possible implementations of systems, methods and computer program products according to various embodiments of the disclosed embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer program instructions.

The terminology and description provided herein is for the purpose of describing particular embodiments only and is not intended to be limiting. A number of alternatives, modifications, variations, or improvements therein may be subsequently made by those skilled in the art, which are also intended to be encompassed by the following claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A non-volatile computer readable medium comprising a first set of computer program instructions that, when executed by a first hardware processor, configure the first hardware processor to:
    a. collect a candidate choice from a voter through a voter device;
    b. communicate with a smartcard through a smartcard reader;
    c. authenticate the voter;
    d. send a proposed ballot to a vote server over a computer network;
    e. receive a first recorded ballot from the vote server over the computer network, wherein the first recorded ballot comprises a digital signature and the digital signature is generated by the vote server; and
    f. send the first recorded ballot to an audit server over the computer network;
    g. print a physical receipt, wherein the physical receipt comprises the first recorded ballot;

and comprising a second set of computer program instructions that, when executed by a second hardware processor, configure the second hardware processor to:
    h. receive the proposed ballot from the voter device over the computer network;
    i. generate the first recorded ballot;
    j. send the first recorded ballot to the voter device over the computer network;
    k. send a first tree to a public repository over the computer network, wherein the first tree comprises the first recorded ballot; and l. send a second tree to the voter device over the computer network, wherein the second tree comprises the first recorded ballot;

and comprising a third set of computer program instructions that, when executed by the second hardware processor, configure the second hardware processor to:
  m. publish a mathematical summary of one or more registration materials; and
  n. compute a tally via a tally generation process, wherein the tally generation process comprises storing encrypted ballot selections in a hashmap, the hashmap comprises hashmap keys and hashmap values, the hashmap keys are ballot options, and the hashmap values are the encrypted ballot selections.

2. The non-volatile computer readable medium of claim 1, further comprising a fourth set of computer program instructions that, when executed by the smartcard, configure the smartcard to:
  o. generate a voter keypair; and
  p. encrypt the proposed ballot or the first recorded ballot.

3. The non-volatile computer readable medium of claim 2, further comprising a fifth set of computer program instructions that, when executed by a third hardware processor, configure the third hardware processor to:
  q. actuate a barcode scanner to scan the physical receipt;
  r. collect a password from the voter with a touchscreen;
  s. collect biometric data from the voter and authenticate the biometric data; and
  t. connect to the smartcard via a physical electronic contact or a wireless communication device.

4. The non-volatile computer readable medium of claim 3, further comprising a sixth set of computer program instructions that, when executed by the third hardware processor, configure the third hardware processor to:
  u. accept a password or a ballot selection via an electronic braille interface; and
  v. actuate a security alarm via a speaker.

5. The non-volatile computer readable medium of claim 4, further comprising a seventh set of computer program instructions that, when executed by the third hardware processor, configure the third hardware processor to:
  w. summon a pollworker.

6. The non-volatile computer readable medium of claim 5, wherein the smartcard does not comprise visible voter information.

7. The non-volatile computer readable medium of claim 6, further comprising a eighth set of computer program instructions that, when executed by the smartcard, configure the smartcard to:
  x. accept a first personal identification number; and
  y. compare the first personal identification number to a second personal identification number stored in a non-volatile smartcard memory.

8. The non-volatile computer readable medium of claim 7, wherein the non-volatile smartcard memory comprises a trusted platform module.

9. The non-volatile computer readable medium of claim 1, wherein the tally generation process further comprises iterating through hashmap keys, extracting a hashmap value, placing the hashmap value in a list labeled with a hashmap key, applying a homomorphic sum operation to the list to generate a sum, and decrypting the sum using the Paillier protocol.

10. The non-volatile computer readable medium of claim 1, further comprising a fourth set of computer program instructions that, when executed by the first hardware processor, configure the first hardware processor to:
  o. protect the physical receipt from tampering under a glass viewing pane;
  p. display the physical receipt to the voter for approval; and
  q. deposit the physical receipt into a physical ballot box.

11. The non-volatile computer readable medium of claim 10, further comprising a fifth set of computer program instructions that, when executed by the second hardware processor, configure the second hardware processor to:
  r. connect to the public repository over the computer network;
  s. search the public repository for a recorded ballot set, wherein the recorded ballot set comprises one or more recorded ballots cast by the voter; and
  t. execute a ballot adjudication process, wherein the ballot adjudication process comprises sorting the recorded ballot set by timestamp, marking the most recent recorded ballot in the recorded ballot set as valid, and marking superseded recorded ballots in the recorded ballot set as invalid.

12. The non-volatile computer readable medium of claim 11, wherein the recorded ballot set comprises an alternative casted ballot, the alternative casted ballot comprises filled-in bubbles, and the second hardware processor is configured to scan and parse the filled-in bubbles.

\* \* \* \* \*